United States Patent
Takada et al.

(10) Patent No.: US 8,062,731 B2
(45) Date of Patent: Nov. 22, 2011

(54) ANTIREFLECTION HARD COATING FILM, OPTICAL ELEMENT AND IMAGE DISPLAY

(75) Inventors: Katsunori Takada, Ibaraki (JP); Takayuki Shigematsu, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 875 days.

(21) Appl. No.: 11/883,505

(22) PCT Filed: Jan. 13, 2006

(86) PCT No.: PCT/JP2006/000358
§ 371 (c)(1),
(2), (4) Date: Aug. 1, 2007

(87) PCT Pub. No.: WO2006/082701
PCT Pub. Date: Aug. 10, 2006

(65) Prior Publication Data
US 2008/0160257 A1    Jul. 3, 2008

(30) Foreign Application Priority Data
Feb. 1, 2005   (JP) .................. 2005-025345

(51) Int. Cl.
*G02B 1/11*    (2006.01)
*B32B 9/04*    (2006.01)
*B32B 7/02*    (2006.01)
*B32B 27/00*   (2006.01)
*B32B 3/00*    (2006.01)
*D06N 7/04*    (2006.01)

(52) U.S. Cl. ............... 428/145; 428/313.9; 428/334; 428/447; 428/421

(58) Field of Classification Search .......... 428/145, 428/334, 447, 313.9, 421
See application file for complete search history.

(56) References Cited

U.S. PATENT DOCUMENTS
2004/0070041 A1   4/2004   Obayashi et al.
(Continued)

FOREIGN PATENT DOCUMENTS
JP           9-222503 A     8/1997
(Continued)

OTHER PUBLICATIONS

Taiwanese Office Action, issued in corresponding Taiwanese Patent Application No. 095102063 (also cites JP2004-264327 listed in IDS filed Aug. 1, 2007).

(Continued)

*Primary Examiner* — David Sample
*Assistant Examiner* — Tahseen N Khan
(74) *Attorney, Agent, or Firm* — Westerman, Hattori, Daniels & Adrian, LLP

(57) ABSTRACT

An antireflection hard coating film of the invention comprises: a transparent plastic film substrate; and at least one hard coating layer of a cured coating layer and at least one antireflection layer that are formed in this order on at least one side of the transparent plastic film substrate, wherein a hard coating layer-forming material contains 100 parts by weight of a (meth)acrylate group-containing curable compound (A) and 0.01 to 3 parts by weight of a (meth)acrylate group-containing reactive silicone (B), and an antireflection layer-forming material contains a siloxane component-containing compound, at the interface between the hard coating layer and the antireflection layer being in direct contact with each other. The antireflection hard coating film has good adhesion between the hard coating layer and the antireflection layer, high hardness, and good scratch resistance without a reduction in antireflection properties.

12 Claims, 1 Drawing Sheet

U.S. PATENT DOCUMENTS

| | | |
|---|---|---|
| 2006/0052565 A1* | 3/2006 | Yoshioka et al. .......... 528/10 |
| 2006/0057307 A1 | 3/2006 | Matsunaga et al. |
| 2008/0182038 A1 | 7/2008 | Matsunaga et al. |

FOREIGN PATENT DOCUMENTS

| | | |
|---|---|---|
| JP | 9-226062 A | 9/1997 |
| JP | 2001-74908 A | 3/2001 |
| JP | 2003-344603 A | 12/2003 |
| JP | 2004-167827 A | 6/2004 |
| JP | 2004-170901 A | 6/2004 |
| JP | 2004-264327 A | 9/2004 |
| JP | 2005-4163 A | 1/2005 |
| JP | 2005-535934 A | 11/2005 |
| TW | 200405030 A | 4/2004 |
| WO | WO 2004/017105 A1 | 2/2004 |
| WO | WO 2004/046247 A1 | 6/2004 |
| WO | WO 2004/066001 A1 | 8/2004 |

OTHER PUBLICATIONS

International Search Report of PCT/JP2006/300358, date of mailing Apr. 11, 2006.
International Preliminary Report on Patentability of International Application No. PCT/JP2006/300358 mailed Aug. 16, 2007.

* cited by examiner

[FIG.1]
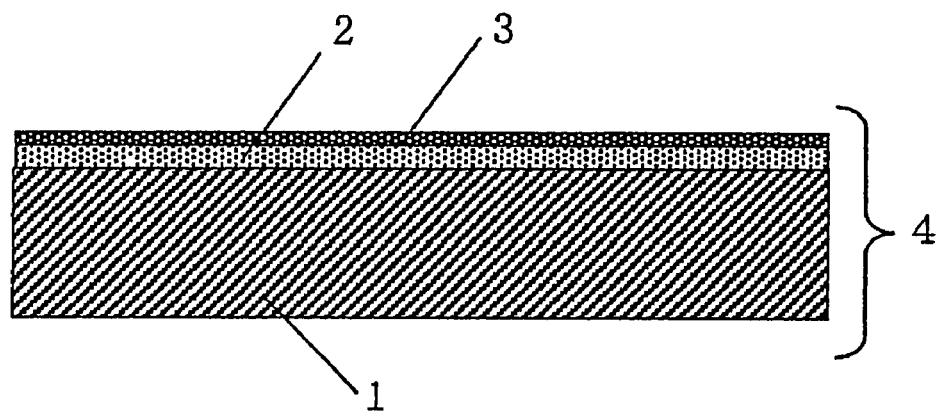
[FIG.2]
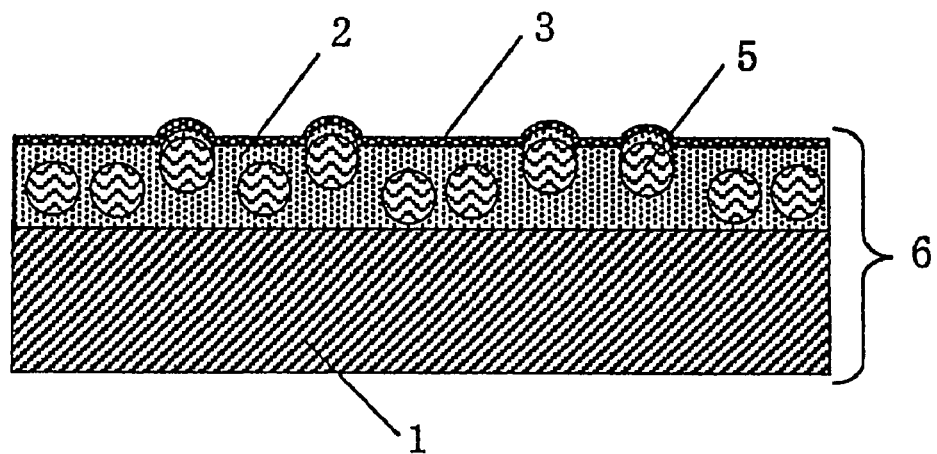

ANTIREFLECTION HARD COATING FILM, OPTICAL ELEMENT AND IMAGE DISPLAY

TECHNICAL FIELD

The invention relates to an antireflection hard coating film comprising a hard coating layer and an antireflection layer provided on at least one side of a transparent plastic film substrate in this order. Moreover, the invention relates to an optical element such as a polarizing plate using the antireflection hard coating film. An antireflection hard coating film and an optical element of the invention are preferably used in image display, especially in CRT, a liquid crystal display (LCD), plasma display (PDP), an EL display (ELD) or the like.

BACKGROUND ART

As LCDs, one of many types of image displays, have been technically improved to provide wide viewing angles, high resolution, high response, good color reproduction, and the like, applications of LCDs are spreading from laptop personal computers and monitors to television sets. In a basic LCD structure, two flat glass substrates each provided with a transparent electrode are opposed via a spacer to form a constant gap, between which a liquid crystal material is placed and sealed to form a liquid crystal cell, and a polarizing plate is adhered on the outside surface of each flat glass substrates. In a conventional technique, a glass or plastic cover plate is attached to the surface of a liquid crystal cell in order to prevent scratches on a polarizing plate bonded to the surface of the liquid crystal cell because of low scratch resistance of the polarizing plate. However, the placement of such a cover plate is disadvantageous in terms of cost and weight. Thus, a hard-coating process has gradually been used to treat the surface of polarizing plates. The hard-coating process is commonly conducted in a way such that a hard coating film comprising a transparent plastic substrate on which a hard coating layer is formed is provided on a side of a polarizing plate.

Besides, in a case where a hard coating film is adhered onto various kinds of image displays, visibility of a display is reduced by light reflection on a display surface, which is on a polarizing plate surface. Hence, more improvement on visibility is required to a hard coating film. In particular, visibility can be significantly reduced by surface reflection in various personal digital assistances such as car navigation monitors, video camera monitors, cellular phones, and PHS, which are frequently used in outdoor environments. Therefore, polarizing plates generally undergo an antireflection treatment. Particularly, polarizing plates to be installed in the personal digital assistances have to undergo an antireflection treatment.

The antireflection treatment is designed to reduce reflection as much as possible in the visible light range and thus generally includes forming a multilayered structure of thin films different in refractive index or a monolayer structure of a low refractive index material by a dry process such as vacuum deposition, sputtering and CVD or by a wet process with a die or a gravure roll coater. In general, an antireflection layer (low refractive index layer) with a monolayer structure is industrially used, because it can be produced with no complicated process and allows a cost reduction.

In a conventional antireflection hard coating film, however, an antireflection layer is composed of a thin film with a thickness of 0.1 to 0.5 μm, and the interlayer adhesion is weak. Such a film can easily cause failure at the interface with the hard coating layer and has difficulty in achieving satisfactory film strength and durability such as chemical resistance.

LCD applications have come to include home television sets, and thus it is easily expected that the users of general home television sets should handle LCD television sets in the same manner as in the case of glass CRT television sets. Therefore, there has been a demand for antireflection hard coating films with further improved hardness and improved film strength and chemical resistance.

In order to improve the film strength and chemical resistance, there is proposed a method in which the adhesion at the interface between stacked hard coating layer and antireflection layer is increased by various surface-modifying processes such as a corona discharge treatment (see Patent Literature 1 below). After coating, the strength and chemical resistance of the antireflection layer can be improved by these modification processes. However, the hard coating layer can often be unevenly processed, and when an antireflection layer is formed thereon by coating, uneven coating can often occur, which provides a problem for antireflection properties.

There is also proposed an antireflection hard coating film that includes a high refractive index hard coating layer mainly produced from an ionizing radiation-curable resin containing a reactive organosilicon compound, so that the antireflection layer can have excellent adhesion to the high refractive index hard coating layer (see Patent Literature 2 below). According to Patent Literature 2, however, the reactive organosilicon compound makes up 10 to 100% by weight of the resin components of the hard coating layer, and thus it is difficult to achieve satisfactory adhesion and hardness at the same time.

Patent Literature 1: JP-A No. 09-222503
Patent Literature 2: JP-A No. 09-226062

DISCLOSURE OF INVENTION

Objects to be Achieved by the Invention

It is an object of the invention to provide an antireflection hard coating film that includes a transparent plastic film substrate and at least one hard coating layer and at least one antireflection layer formed in this order on at least one side of the film substrate and has good adhesion between the hard coating layer and the antireflection layer, high hardness, and good scratch resistance without a reduction in antireflection properties.

It is another object of the invention to provide an optical element using the antireflection hard coating film, and it is an object of the invention to further provide an image display having the film or the optical element.

The inventors have conducted serious studies in order to solve the problems with the result that it has been found that the objects can be achieved with the following hard coating film and the like, which has led to completion of the invention.

The present invention relates to an antireflection hard coating film, comprising:

a transparent plastic film substrate; and at least one hard coating layer of a cured coating layer and at least one antireflection layer that are formed in this order on at least one side of the transparent plastic film substrate, wherein a hard coating layer-forming material contains 100 parts by weight of a (meth)acrylate group-containing curable compound (A) and 0.01 to 3 parts by weight of a (meth)acrylate group-containing reactive silicone (B), and an antireflection layer-forming material contains a siloxane component-containing compound, at the interface between the hard coating layer and the antireflection layer being in direct contact with each other.

According to the invention, hardness is imparted to the hard coating layer by the use of the (meth)acrylate group-containing curable compound (A) in the hard coating layer-forming material. It also imparts elasticity and flexibility (bending properties). In a mixture of the curable compound (A) and the (meth)acrylate group-containing reactive silicone (B), the content of the reactive silicone (B) is kept at a certain low level relative to that of the curable compound (A), and thus the mixture is prevented from reducing the hardness of the hard coating layer. In addition, the antireflection layer also contains the siloxane component. These features can improve the adhesion at the interface between the hard coating layer and the antireflection layer, so that the antireflection layer can be prevented from peeling at the interface with the hard coating layer. According to the invention as described above, the adhesion between the hard coating layer and the antireflection layer can be improved even when a surface-modifying process such as a corona discharge treatment is not performed on the surface of the hard coating layer. Thus, the hard coating layer can be formed with no unevenness in coating, and there is no reduction in the antireflection properties of the antireflection layer. The hard coating layer containing a certain amount of the reactive silicone (B) and the antireflection layer containing the siloxane component also have excellent scratch resistance. In addition, the antireflection layer also has high chemical resistance.

In the antireflection hard coating film, the reactive silicone (B) having a siloxane structure-containing silicone moiety and a (meth)acrylate group in a single molecule can be used.

In the antireflection hard coating film, the siloxane structure preferably has a polysiloxane unit comprising the repeating unit —(Si($R^1$)($R^2$)—O)—, wherein $R^1$ and $R^2$ are each an alkyl group having 1 to 6 carbon atoms or a phenyl group.

In the antireflection hard coating film, the polysiloxane unit comprises a dimethylsiloxane unit represented by formula (1):

[formula 1]

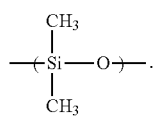

(1)

In the antireflection hard coating film, the reactive silicone (B) preferably has an active hydrogen group. The reactive silicon (B) having an active hydrogen group in addition to the (meth)acrylate group can further improve the adhesion between the hard coating layer and the antireflection layer. It is also preferred in view of antireflection properties, scratch resistance and chemical resistance. The active hydrogen group is preferably of a hydroxyl group.

In the antireflection hard coating film, the reactive silicone (B) having a methyl, 3-acryloyl-2-hydropropoxypropyl siloxane unit represented by formula (2):

[formula 2]

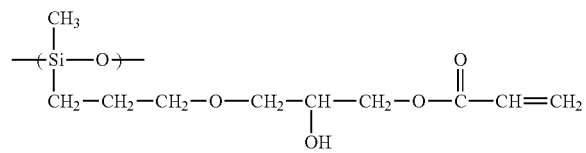

(2)

and/or a methyl, 2-acryloyl-3-hydropropoxypropyl siloxane unit represented by formula (3):

[formula 3]

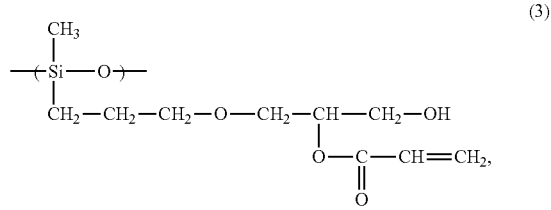

(3)

are exemplified.

In the antireflection hard coating film, the reactive silicone (B) having a methyl, acrylate group-terminated polyethylene glycol propyl ether unit represented by formula (4):

[formula 4]

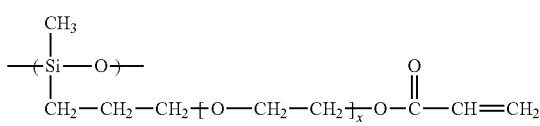

(4)

wherein x is an integer of 1 to 10, and
a methyl, hydroxy group-terminated polyethylene glycol propyl ether unit represented by formula (5):

[formula 5]

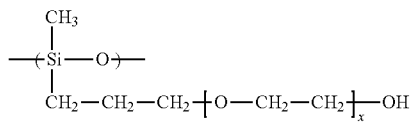

(5)

wherein x is an integer of 1 to 10, are exemplified.

In the antireflection hard coating film, the reactive silicone (B) is exemplified a mixture of compounds represented by formula (6):

[formula 6]

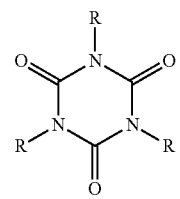

(6)

wherein at least one of the R groups has at least one substituent selected from a siloxane structure-containing substituent, a (meth)acrylate group-containing substituent, and an active hydrogen group-containing substituent, and wherein in the mixture, the R groups include a siloxane structure-containing substituent, a (meth)acrylate group-containing substituent, and an active hydrogen group-containing substituent.

The compounds represented by formula (6) preferably have a structure represented by formula (7):

[formula 7]

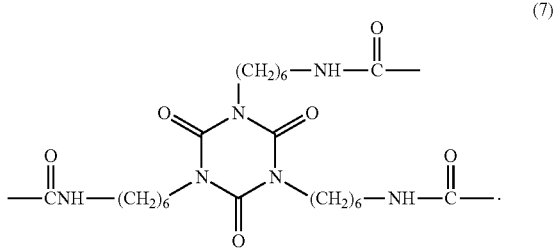
(7)

The siloxane structure-containing substituent represented by R in the compounds represented by formula (6) preferably has a unit represented by formula (8):

[formula 8]

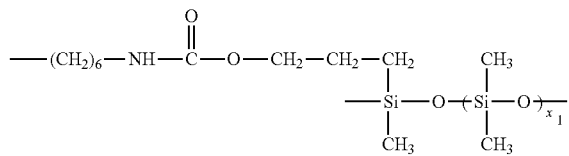
(8)

wherein x1 is from 1 to 7.

The active hydrogen group-containing substituent represented by R in the compounds represented by formula (6) preferably has a unit represented by formula (9):

[formula 9]

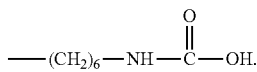
(9)

The acrylate group-containing substituent represented by R in the compounds represented by formula (6) preferably has a unit represented by formula (10):

[formula 10]

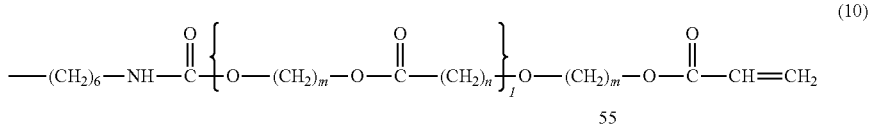
(10)

wherein m and n is the same or different and are each an integer of 1 to 10, and l is from 1 to 5.

In the antireflection hard coating film, a thickness of the hard coating layer is preferably controlled in the range of 2 to 50 μm.

In the antireflection hard coating film, the antireflection layer-forming material preferably contains a siloxane oligomer (C) with an ethylene glycol-equivalent average molecular weight of 500 to 10000 and a fluorine compound (D) having a polystyrene-equivalent number average molecular weight of 5000 or more and having a fluoroalkyl structure and a polysiloxane structure.

In the antireflection hard coating film, ultrafine particles of silicon oxide each in the shape of a hollow sphere are preferably contained in the antireflection layer.

In the antireflection hard coating film, the hard coating layer may have an irregular surface with antiglare properties.

The invention also related to an optical element comprising the antireflection hard coating film laminated on one side or both sides of an optical element.

The invention further relates to an image display comprising the antireflection hard coating film, or the optical element.

An antireflection hard coating film of the invention can be preferably used in an optical element such as a polarizer or a polarizing plate and has a high hardness, and good scratch resistance without a reduction in antireflection properties, and can be preferably used in a image display such as a LCD in a home television receiver, as well.

BRIEF DESCRIPTION OF THE DRAWINGS

FIG. 1 is a cross-sectional view showing an example of the antireflection hard coating film of the invention.

FIG. 2 is a cross-sectional view showing another example of the antireflection hard coating film of the invention.

DESCRIPTION OF REFERENCE MARKS 1 transparent plastic film substrate
2 hard coating layer
3 antireflection layer
4 antireflection hard coating film
5 fine particles
6 antireflection hard coating film having a structure of fine irregularities

BEST MODE FOR CARRYING OUT THE INVENTION

The antireflection hard coating film of the invention is described with reference to the drawings. Referring to FIG. 1, a hard coated film 4 according to the invention includes a transparent plastic film substrate 1 and a hard coating layer 2 and an antireflection layer 3 formed in this order on one side of the substrate 1. According to the invention, the surface of the hard coating layer may have irregularities as shown in FIG. 2. An antireflection hard coating film 6 shown in FIG. 2 includes: a hard coating layer 2 that contains fine particles 5 to have an irregular surface; and an antireflection layer 3 formed thereon. Although not shown in FIG. 1 or 2, another hard coating layer 2 and/or another antireflection layer 3 may be formed on the other side of the transparent plastic film substrate 1. While FIG. 1 or 2 shows a case where the hard coating layer 2 and the antireflection layer 3 are each a single layer, they may each be composed of two or more layers. It is noted that each layer-forming material according to the invention is used for the layer that forms the interface between the hard coat and antireflection layers being in direct contact with each other.

Especially, no limitation is imposed on a transparent plastic substrate film of the invention as far as the film does not deteriorate transparency.

Examples of materials thereof include: polyesters such as polyethylene terephthalate, polybutylene terephthalate, and polyethylene naphthalate; polycarbonate; polyethylene; polypropylene; polystylene, polyarylate; cyclic olefins; triacetyl cellulose; acrylic-based resin; polyvinyl chlorides; and the like. Each of the examples can be used in a stretched form thereof. Preferable among them is a stretched, especially biaxial stretched polyethylene terephthalate film in that the film is excellent in a mechanical strength and a dimensional stability. Also preferable is triacetyl cellulose in that in-plane retardation of the film is very small. A thickness of a transparent plastic film substrate is properly selected according to an applied material, but generally about in the range of 25 to 500 μm and preferably in the range of from 40 to 200 μm. A refractive index of the transparent plastic film substrate is generally, but not limited to, from about 1.3 to about 1.8, particularly preferably from 1.4 to 1.7.

The hard coating layer-forming material contains the (meth)acrylate group-containing curable compound (A) and the (meth)acrylate group-containing reactive silicone (B).

The (meth)acrylate group-containing curable compound (A) according to the invention is a compound that has a (meth)acrylate group and can be cured by heating, ultraviolet radiation, or electron beams. Examples thereof include silicone resins, polyester resins, polyether resins, epoxy resins, urethane resins, alkyd resins, spiroacetal resins, polybutadiene resins, polythiol-polyene resins, and oligomers or prepolymers of (meth)acrylate of multifunctional compounds such as polyhydric alcohols. The term (meth)acrylate means acrylate and/or methacrylate, and "(meth)" has the same meaning with respect to the invention.

A reactive diluent having a (meth)acrylate group may also be used as the curable compound (A). Examples of the reactive diluent include monofunctional (meth)acrylates such as (meth)acrylates of ethylene oxide-modified phenols, (meth)acrylates of propylene oxide-modified phenols, (meth)acrylates of ethylene oxide-modified nonylphenols, (meth)acrylates of propylene oxide-modified nonylphenols, 2-ethylhexylcarbitol (meth)acrylate, isobornyl(meth)acrylate, tetrahydrofurfuryl(meth)acrylate, hydroxyethyl (meth) acrylate, hydroxypropyl(meth)acrylate, hydroxybutyl(meth) acrylate, hydroxyhexyl(meth)acrylate, diethylene glycol mono(meth)acrylate, triethylene glycol mono(meth)acrylate, and tripropylene glycol mono(meth)acrylate; and polyfunctional (meth)acrylates such as diethylene glycol di(meth) acrylate, triethylene glycol di(meth)acrylate, dipropylene glycol di(meth)acrylate, tripropylene glycol di(meth)acrylate, tetrapropylene glycol di(meth)acrylate, polypropylene glycol di(meth)acrylate, 1,4-butanediol di(meth)acrylate, neopentyl glycol di(meth)acrylate, 1,6-hexanediol di(meth) acrylate, di(meth)acrylate of ethylene oxide-modified neopentyl glycol, di(meth)acrylate of ethylene oxide-modified bisphenol A, di(meth)acrylate of propylene oxide-modified bisphenol A, di(meth)acrylate of ethylene oxide-modified hydrogenated bisphenol A, trimethylolpropane di(meth)acrylate, trimethylolpropane allyl ether di(meth)acrylate, trimethylolpropane tri(meth)acrylate, ethylene oxide-modified trimethylolpropane tri(meth)acrylate, propylene oxide-modified trimethylolpropane tri(meth)acrylate, pentaerythritol tetra(meth)acrylate, dipentaerythritol tetra(meth)acrylate, and dipentaerythritol hexa(meth)acrylate. Examples of the curable compound (A) also include butanediol diglycerine ether diacrylate and (meth)acrylate of isocyanuric acid.

One or more types of the curable compounds (A) may be used alone or in combination. The reactive diluent for use as the curable compound (A) is preferably a tri- or more-functional (meth)acrylate such as trimethylolpropane tri(meth) acrylate, pentaerythritol tetra(meth)acrylate, dipentaerythritol tetra(meth)acrylate, and dipentaerythritol hexa(meth) acrylate. These are preferably used to form a hard coating layer with further improved hardness.

The (meth)acrylate group-containing reactive silicone (B) to be used may be any silicone having a siloxane structure-containing silicone moiety and a (meth)acrylate group in a single molecule.

The siloxane structure may be, but not limited to, a structure having the repeating unit —(Si($R^1$)($R^2$)—O)—. The siloxane structure generally has a polysiloxane unit including a repeat of the above unit. The $R^1$ and $R^2$ groups may each be an alkyl group having 1 to 6 carbon atoms, a phenyl group or the like. The siloxane structure may include a dimethylsiloxane unit represented by formula (1):

[formula 1]

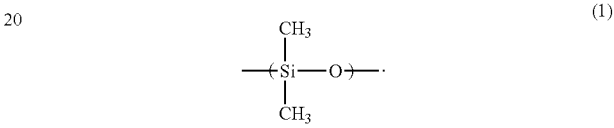

The reactive silicone (B) preferably has an active hydrogen group. The active hydrogen group may be of a hydroxyl group, an amino group, a carboxyl group, or the like. In particular, a hydroxyl group is preferred. The reactive silicone (B) to be used may also have an ally ether group in addition to the (meth)acrylate group.

The (meth)acrylate group and the hydroxyl group may be introduced into the reactive silicone (B), for example, from the siloxane structure having such functional groups in the $R^1$ and $R^2$ substituents. The substituents may each have a (meth) acrylate group or a hydroxyl group, or one of the substituents may have both a (meth)acrylate group and a hydroxyl group. A combination of these substituents may be used to introduce a (meth)acrylate group and a hydroxyl group into the reactive silicone (B).

Examples of the siloxane unit having a (meth)acrylate group and a hydroxyl group in a single substituent include: a methyl, 3-acryloyl-2-hydropropoxypropyl siloxane unit represented by formula (2):

[formula 2]

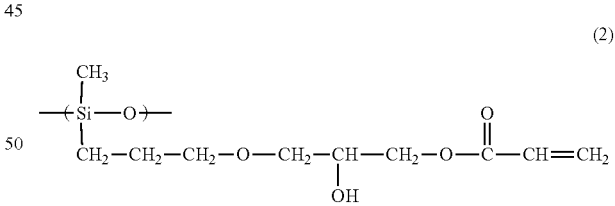

and a methyl, 2-acryloyl-3-hydropropoxypropyl siloxane unit represented by formula (3):

[formula 3]

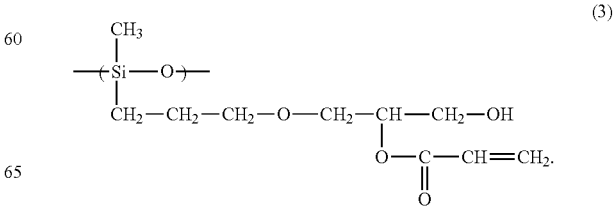

Examples of the siloxane unit having a (meth)acrylate group include a methyl, acrylate group-terminated polyethylene glycol propyl ether unit represented by formula (4):

[formula 4]

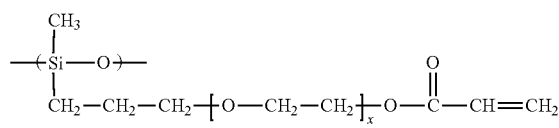
(4)

wherein x is an integer of 1 to 10.

Examples of the siloxane unit having a hydroxyl group include a methyl, hydroxy group-terminated polyethylene glycol propyl ether unit represented by formula (5):

[formula 5]

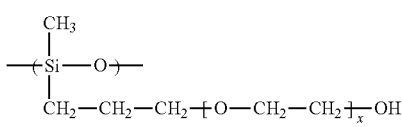
(5)

wherein x is an integer of 1 to 10.

When the reactive silicone (B) has the dimethylsiloxane unit represented by formula (1) and the siloxane unit(s) having a (meth)acrylate group and a hydroxyl group and represented by formula (2) and/or formula (3), the molar ratio between the component represented by formula (1) and the component(s) represented by formula (2) and/or formula (3) is generally preferably from 100:1 to 100:50, more preferably from 100:3 to 100:30.

When the reactive silicone (B) has the dimethylsiloxane unit represented by formula (1), the (meth)acrylate group-containing siloxane unit represented by formula (4) and the hydroxyl group-containing siloxane unit represented by formula (5), the molar ratio between the components represented by formulae (1), (4) and (5), respectively, is generally preferably 100:1-20:0-20, more preferably 100:3-10:3-10.

The reactive silicone (B) may be a compound having not only the introduced siloxane structure and the introduced (meth)acrylate group but also an introduced active hydrogen group. For example, compounds produced by introducing a siloxane structure, an (meth)acrylate group and an active hydrogen group into an isocyanuric acid derived from a diisocyanate compound may be used. For example, such compounds may be a mixture of compounds represented by formula (6):

[formula 6]

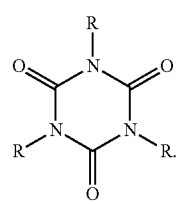
(6)

In formula (6), at least one of the R groups has at least one substituent selected from a siloxane structure-containing substituent, a (meth)acrylate group-containing substituent, and an active hydrogen group-containing substituent. In the mixture, the R groups include a siloxane structure-containing substituent, a (meth)acrylate group-containing substituent, and an active hydrogen group-containing substituent.

Concerning the isocyanuric acid, for example, a skeleton unit of 6-isocyanate hexyl isocyanurate may be represented by formula (7):

[formula 7]

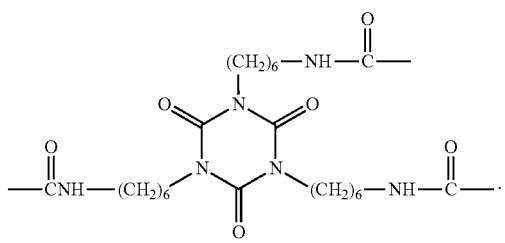
(7)

Among the R groups, for example, the siloxane structure-containing substituent may be a substituent represented by formula (8):

[formula 8]

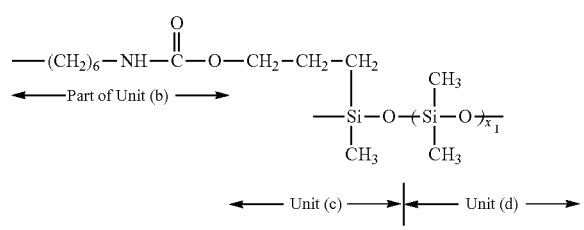
(8)

In formula (8), the hydroxyl group of the compound having the polydimethylsiloxane unit (d) and the methyl, hydroxypropyl siloxane unit (c) as a part is bonded via a urethane bond to the terminal isocyanate group of the 6-isocyanate hexyl isocyanurate, which is part of Unit (b). In the polydimethylsiloxane unit (d), x1 is from 1 to 7.

Among the R groups, for example, the active hydrogen group-containing substituent may be represented by formula (9):

[formula 9]

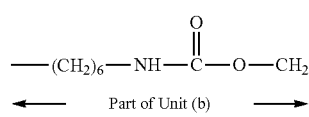
(9)

In formula (9), the terminal isocyanate group of 6-isocyanate hexyl isocyanurate (part of Unit (b)) is carboxylated. It may also be decarboxylated into an amino group.

Among the R groups, for example, the acrylate group-containing substituent may be represented by formula (10):

[formula 10]

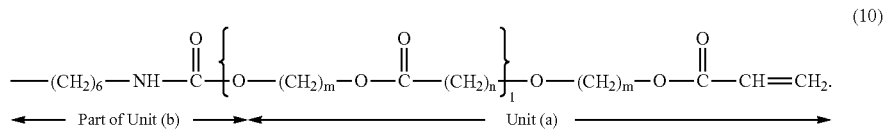

(10)

In formula (10), the terminal isocyanate group of 6-isocyanate hexyl isocyanurate (part of Unit (b)) is bonded to the aliphatic polyester via a urethane bond, and the substituent also has Unit (a) with an acrylated glycol end. In Unit (a), m and n may be the same or different and are each an integer of 1 to 10, and l is from 1 to 5.

When the reactive silicone (B) is a derivative of 6-isocyanate hexyl isocyanurate represented by any of formulae (7) to (10), a molar ratio of Unit (a):Unit (b) is generally 10-100:100, preferably 30-60:100, the molar ratio of Unit (c):Unit (b) is generally 5-80:100, preferably 10-60:100, and the molar ratio of Unit (d):Unit (b) is generally 10-400:100, preferably 100-300:100, with respect to the molar ratio of Unit (a):Unit (b):Unit (c):Unit (d) with the magnitude of Unit (b) fixed at 100.

The molar ratio between the respective components of the reactive silicone (B) was calculated from the integral curve of $^1$H-NMR spectra. A weight average molecular weight of the reactive silicone (B) was measured by GPC (gel permeation chromatography). The weight average molecular weight is preferably from 500 to 150000, more preferably from 2000 to 100000.

The reactive silicone (B) may be used in an amount of 0.01 to 3 parts by weight, preferably of 0.05 to 2 parts by weight, more preferably of 0.1 to 1 part by weight, based on 100 parts by weight of the curable compound (A). If the reactive silicone (B) is used in an amount of less than 0.01 parts by weight, the effect of improving the adhesion between the hard coating layer and the antireflection layer can be insufficient. Such an amount is also unfavorable for the purpose of improving the scratch resistance or in view of chemical resistance. An amount of more than 3 parts by weight can cause reduction in the hardness of the hard coating layer and is also unfavorable in view of scratch resistance.

Curing of a hard coating-layer forming material can be effected by thermal curing, or ionization radiation curing such as ultraviolet curing and various kinds of polymerization initiators can be used so as to be adapted for curing means. A conventional known photopolymerization initiator can be used in a case where an ultraviolet is used as curing means. Examples thereof include: bezoins and alkyl ethers thereof such as benzoin, benzoin methyl ether, benzoin ethyl ether, benzoin isopropyl ether, N,N,N,N-tetramethyl-4,4'-diaminobenzophenone, benzyl methyl ketal; acetophenones such as, acetophenone, 3-methylacetophenone, 4-chlorobenzophenone, 4,4'-dimethoxybenzophenone, 2,2-dimethoxy-2-phenyl acetophenone and 1-hydroxycyclohexyl phenyl ketone; anthraquinones such as methyl anthraquinone, 2-ethyl anthraquinone and 2-amyl anthraquinone; xanthae; thioxanthanes such as thioxanthane, 2,4-diethyl thioxanthane, 2,4-diisopropyl thioxanthane, ketals such as acetophenone dimethyl ketal and benzyl dimethyl ketal; benzophenones such as benzophenone and 4,4'-bismethylaminobenzophenone; and others such as 1-(4-isopropylphenyl)-2-hydroxy-2-methyl propane-1-one. Those can be used either alone or a mixture of two kinds or more. A quantity of use of a photopolymerization initiator is preferably about 10 parts by weight or less and more preferably in the range of 1 to 7 parts by weight relative to all the resin components in a hard coating layer-forming material {the total sum of the component (A) and the component (B)} 100 parts by weight.

The hard coating layer-forming material may contain inorganic ultrafine particles. The inorganic ultrafine particles is exemplified as titanium oxide, silicon oxide, aluminum oxide, zinc oxide, tin oxide, zirconium oxide, calcium oxide, indium oxide, antimony oxide. The composite of these can be used. Among them, titanium oxide, silicon oxide (silica), aluminum oxide, zinc oxide, tin oxide, zirconium oxide is preferable. The inorganic ultrafine particles can be used either alone or in a mixture of two kinds thereof.

An average particle diameter of inorganic ultrafine particles is preferably 100 nm or less. If an average diameter exceeds 100 nm, light scattering occurs to thereby reduce a transmittance of a hard coating layer or color the layer, which is unpreferable in regard to transparency. An average particle diameter of inorganic ultrafine particles is preferably 50 nm or less and more preferably 30 nm or less.

Inorganic ultrafine particles have a function to adjust an apparent refractive index of a hard coating layer depending on a mixing quantity. It is preferable that a refractive index of a transparent plastic film substrate and a refractive index of a hard coating layer approximates to each other. Hence, it is preferably to properly adjust a mixing quantity of inorganic ultrafine particles so as reduce a difference (d) in refractive index between the transparent plastic film substrate and the hard coating layer for preparing a hard coating layer-forming material. If the refractive index difference (d) is larger, a phenomenon occurs that is called as interference fringes showing hues of a rainbow caused by a reflected light of external light striking the hard coating film, resulting in degradation of display quality. In an office where, especially, an image display with a hard coating film is used with a high frequency, three wavelength fluorescent lamps have been increasingly used very much as a fluorescent lamp. A three wavelength fluorescent lamps has a feature that an intensity of a light emission with a specific wavelength is high to thereby render an object to be seen clearly, but it has been understood that interference fringes appear more conspicuously under illumination of the three wavelength fluorescent lamps.

A refractive index difference (d) is preferably 0.04 or less. A refractive index difference (d) is more preferably 0.02 or less. For example, in a case where a polyethylene terephthalate film is used as a transparent plastic film substrate, titanium oxide is used as a material of inorganic ultrafine particles in a hard coating layer-forming material in an example and a mixing quantity thereof is of about 35% relative to all the resin components in a hard coating layer-forming material, thereby enabling a refractive index difference (d) from a refractive index of about 1.64 of a polyethylene terephthalate film to be adjusted 0.04 or less and again thereby enabling occurrence of interference fringes to be suppressed. In a case where triacetyl cellulose film is used as a transparent plastic film substrate, silicon oxide is used as a material of inorganic ultrafine particles in a hard coating layer-forming material in an example, and a mixing quantity thereof is of about 40% relative to all the resin components in the hard coating layer-forming material, thereby enabling a refractive index difference (d) from a refractive index of about 1.48 of a triacetyl cellulose film to be adjusted 0.02 or less similar to that as described above and again thereby enabling occurrence of interference fringes to be suppressed.

Various kinds of leveling agents can be added into a hard coating layer-forming material. A fluorine-based or silicone-based leveling agent is preferably properly selected for use. More preferable is a silicone-based leveling agent. Examples of the silicone-based leveling agent include: polydimethylsiloxane, polyether-modified polydimethylsiloxane, polymethylalkylsiloxane and others. A mixing quantity of a fluorine-based or silicone-based leveling agent is preferably 5 parts by weight or less and more preferably in the range of from 0.01 to 5 parts by weight relative to 100 parts by weight of a resin.

In a case where ultraviolet light is used to cure the hard coating layer-forming material, the leveling agent in the hard coating layer-forming material can bleed to the air interface during the steps of pre-drying and drying off the solvent so that the effect of inhibiting curing of UV-curable resin by oxygen can be blocked and that a hard coating layer having sufficient hardness even at the uppermost surface can be obtained. The silicone leveling agent can also bleed to the surface of the hard coating layer to provide lubricity and thus can increase scratch resistance.

If necessary, the hard coating layer-forming material may contain a pigment, a filler, a dispersing agent, a plasticizer, a ultraviolet absorbing agent, a surfactant, an antioxidant, a thixotropy-imparting agent, or the like, as long as the performance is not degraded. One of these additives may be used alone, or two or more of these additives may be used together.

The hard coating layer can be fabricated by forming a hard coating layer, on at least one side of a transparent plastic film substrate, which is a cured coat layer obtained by curing an uncured coat after coating the hard coating layer-forming material. The hard coating layer-forming material, in coating, can be coated as a solution obtained by dissolving the hard coating layer-forming material into a solvent. In a case where a hard coating layer-forming material is coated as a solution, the wet coat is dried, followed by curing.

Examples of the solvent include: ketones such as acetone, methyl ethyl ketone, methyl isobutyl ketone, cyclopentanone and cyclohexanone; esters such as ethyl acetate and butyl acetate; alcohols such as isopropyl alcohol and ethyl alcohol; aromatic hydrocarbons such as benzene, toluene, xylene, methoxybenzene and 1,2-dimethoxybenzene; phenols such as phenol and parachlorophenol; halogenated hydrocarbons such as chloroform, dichloromethane, dichloroethane, tetrachloroethane, trichloroethylene, tetrachloroethylene and chlorobenzene. The solvents can be used either alone or in a mixture of two kinds thereof. A solid matter concentration in the solution is usually preferably 70 wt % or less and more preferably in the range of from 30 to 60 wt %.

The hard coating layer-forming material may be applied to the film substrate by any conventional coating method such as fountain coating, die coating, spin coating, spray coating, gravure coating, roll coating, and bar coating.

While the hard coating layer-forming material may be cured by any method, ionizing radiation curing is preferably used. While any type of activation energy may be used for such curing, ultraviolet light is preferably used. Preferred examples of the energy radiation source include high-pressure mercury lamps, halogen lamps, xenon lamps, metal halide lamps, nitrogen lasers, electron beam accelerators, and radioactive elements. The amount of irradiation with the energy radiation source is preferably from 50 to 5000 mJ/cm$^2$ in terms of accumulative exposure at an ultraviolet wavelength of 365 nm. If the amount of irradiation is less than 50 mJ/cm$^2$, curing can be insufficient so that the hardness of the hard coating layer can be degraded in some cases. Beyond 5000 mJ/cm$^2$, the hard coating layer can be colored and have reduced transparency in some cases.

No specific limitation is placed on a thickness of the hard coating layer, which is a cured coat layer obtained by curing the hard coating layer-forming material, but a thickness thereof is preferably in the range of from 2 to 50 µm as described above. A thickness of the hard coating layer is more preferably in the range of from 5 to 30 µm, further more preferably in the range of from 15 to 2 µm. If a thickness of the hard coating layer is thinner than 15 µm, a hardness thereof is easy to be reduced, while if a thickness thereof is thicker than 50 µm, there may arise an practically problem that cracking occurs in the hard coating layer itself or a hard coating film is curled on a hard coat surface due to cure shrinkage of the hard coat.

The hard coating layer is generally formed as a thin coating film with a thickness of about 2 to 10 µm on a transparent plastic film substrate by the use of a thermosetting resin or an ionizing radiation-curable resin such as an ultraviolet radiation-curable resin. In general, however, the above thickness of the hard coating layer can be insufficient so that even a hard coat resin that can have a pencil hardness of 4H or more when applied to glass can be influenced by the underlying transparent plastic film substrate and can form a hard coating layer with a surface pencil hardness of 2H or less on the transparent plastic film substrate. If a hardness of 3H or more is necessary, therefore, the thickness of the hard coating layer should preferably be set at 15 to 25 µm.

The surface of the hard coating layer may be formed so as to have a structure of fine irregularities and thus anti-glare properties. Any appropriate method may be used to form the structure of fine irregularities on the surface. An example of the method includes previously roughening the surface of the film used to form the hard coating layer by an appropriate method such as sand blasting, roll embossing and chemical etching such that the surface of the film (the material itself forming the hard coating layer) is formed to have the structure of fine irregularities. Another example of the method includes coating the hard coating layer with another hard coating layer and forming the structure of fine irregularities on the surface of the resin coating layer by a transfer method with a mold or the like. A further example of the method includes forming a hard coating layer containing dispersed fine particles as shown in FIG. 2 such that the structure of fine irregularities are formed. Two or more of these methods for forming the structure of fine irregularities may be used in combination to form a layer having a combination of surfaces with different structures of fine irregularities. Among the above methods for forming the hard coating layer, the method of forming the hard coating layer containing dispersed fine particles 4 is preferred in view of the ability to form the fine irregularity structure surface and the like.

A description is given below of the method of forming the hard coating layer containing dispersed fine particles. The fine particles 4 to be used may be of any transparent material such as various metal oxides, glass and plastics. Examples thereof include fine particles of metal oxides such as silica, zirconia, titania, and calcium oxide; fine particles of electrically-conductive inorganic materials such as electrically-conductive alumina, tin oxide, indium oxide, cadmium oxide, and antimony oxide; crosslinked or uncrosslinked organic fine particles of various polymers such as poly(methyl methacrylate), polystyrene, polyurethane, acrylic-styrene copolymers, benzoguanamine, melamine, and polycarbonate; and crosslinked or uncrosslinked silicone fine particles. The fine particles may have any shape and may be in the form of spherical beads or may be of indefinite shape such as powder. A single type or two or more types of fine particles 4 may be appropriately selected and used. The fine particles may have an average particle size of 1 to 30 µm, preferably 2 to 20 µm. For the purpose of controlling refractive index or imparting electrical conductivity, ultrafine particles of metal oxide or the like may be dispersed in the fine particles, or the fine particles may be impregnated with ultrafine particles of metal oxide or the like. The content of the fine particles may be appropriately determined depending on the average particle size of the fine particles, the thickness of the hard coating layer, and the like. The amount of the fine particles is generally from about 2 to about 60 parts by weight, preferably from 5 to 40 parts by weight, based on 100 parts by weight of the resin.

The antireflection layer-forming material contains a siloxane component-containing compound. For example, such a compound may be hydrolyzable alkoxysilane. Examples thereof include tetraalkoxysilanes such as tetramethoxysilane, tetraethoxysilane, tetrapropoxysilane, and tetrabutoxysilane; trialkoxysilanes such as methyltrimethoxysilane, methyltriethoxysilane, ethyltrimethoxysilane, ethyltriethoxysilane, propyltrimethoxysilane, propyltriethoxysilane, butyltrimethoxysilane, butyltriethoxysilane, pentyltrimethoxysilane, pentyltriethoxysilane, heptyltrimethoxysilane, heptyltriethoxysilane, octyltrimethoxysilane, octyltriethoxysilane, dodecyltrimethoxysilane, dodecyltriethoxysilane, hexadecyltrimethoxysilane, dexadecyltriethoxysilane, octadecyltrimethoxysilane, octadecyltriethoxysilane, phenyltrimethoxysilane, phenyltriethoxysilane, vinyltrimethoxysilane, vinyltriethoxysilane, γ-aminopropyltrimethoxysilane, γ-aminopropyltriethoxysilane, γ-glycidoxypropyltrimethoxysilane, γ-glycidoxypropyltriethoxysilane, γ-methacryloxypropyltrimethoxysilane, and γ-methacryloxypropyltriethoxysilane; and dialkoxysilanes such as dimethyldimethoxysilane and dimethyldiethoxysilane. In particular, tetramethoxysilane and tetraethoxysilane are preferred in order to improve the scratch resistance of the cured film.

The antireflection layer-forming material to be used may be a curable resin composition that contains a siloxane oligomer (C) with an ethylene glycol-equivalent average molecular weight of 500 to 10000 and a fluorine compound (D) having a polystyrene-equivalent number average molecular weight of 5000 or more and having a fluoroalkyl structure and a polysiloxane structure. Such a curable resin composition may be that disclosed in JP-A No. 2004-167827. Alternatively, the siloxane oligomer (C) or the fluorine compound (D) having the fluoroalkyl structure and the polysiloxane structure may be used alone.

The siloxane oligomer (C) to be used may be of any type with an average molecular weight in the above range. The siloxane oligomer (C) may be prepared by polymerizing hydrolyzable alkoxysilane, or a commercially available siloxane oligomer may be used without being processed. The siloxane oligomer (C) may be obtained by a process including the steps of adding hydrolyzable alkoxysilane to a large amount of an alcohol solvent (such as methanol or ethanol) and allowing it to react in the presence of water and an acid catalyst (such as hydrochloric acid or nitric acid) at room temperature for several hours such that it is partially hydrolyzed and then polycondensed. The polymerization degree of the siloxane oligomer (C) may be controlled by the amount of the addition of the hydrolyzable alkoxysilane and water. The hydrolyzable alkoxysilane to be used may be any of those listed above.

The fluorine compound (D) having the fluoroalkyl structure and the polysiloxane structure to be used may be of any type with a polystyrene-equivalent number average molecular weight of 5000 or more. For example, a perfluoroalkylalkoxysilane having an alkoxysilyl group condensable by a sol-gel reaction may be polycondensed with a hydrolyzable alkoxysilane material mainly composed of a tetraalkoxysilane represented by formula (1): $Si(OR^1)_4$, wherein $R^1$ represents an alkyl group having 1 to 5 carbon atoms, in the presence of an organic acid (such as oxalic acid) or an ester in an alcohol solvent (such as methanol or ethanol) by heating so that the fluorine compound (D) can be obtained. The resulting compound (D) has the introduced polysiloxane structure.

While the reactive components may be in any ratio, in general, the hydrolyzable alkoxysilane is preferably from about 1 to about 100 moles, more preferably from 2 to 10 moles, based on 1 mole of the perfluoroalkylalkoxysilane.

A compound represented by the general formula: $CF_3(CF_2)_n CH_2 CH_2 Si(OR)_3$, wherein R represents an alkyl group of 1 to 5 carbon atoms, and n represents an integer of 0 to 12, is exemplified as perfluoroalkylalkoxysilane. Specific examples include trifluoropropyltrimethoxysilane, trifluoropropyltriethoxysilane, tridecafluorooctyltrimethoxysilane, tridecafluorooctyltriethoxysilane, heptadecafluorodecyltrimethoxysilane, and heptadecafluorodecyltriethoxysilane. In particular, the compounds whose n is from 2 to 6 are preferred.

Examples of the tetraalkoxysilane represented by formula (1): $Si(OR^1)_4$, wherein $R^1$ represents an alkyl group having 1 to 5 carbon atoms, include tetramethoxysilane, tetraethoxysilane, tetrapropoxysilane, and tetrabutoxysilane. In particular, tetramethoxysilane, tetraethoxysilane or the like is preferred. For the preparation of the fluorine compound (D), the tetraalkoxysilane represented by formula (1) may generally make up 80% or more of the hydrolyzable alkoxysilanes, and any of the above hydrolyzable alkoxysilanes not represented by formula (1) may be used together.

The fluorine compound (D) preferably has a hydroxyl group and/or an epoxy group. The hydroxyl and/or epoxy group of the fluorine compound (D) can react with the polysiloxane structure of the siloxane oligomer (C) or the fluorine compound (D) to increase the strength of the cured film so that the scratch resistance can be further improved. The hydroxyl group and/or the epoxy group may be introduced into the fluoroalkyl structure or the polysiloxane structure. The hydroxyl group and/or the epoxy group may be introduced by copolymerization of compounds having these functional groups.

A mixing ratio between the siloxane oligomer (C) and the fluorine compound (D) in the curable resin composition of the invention may be adjusted as appropriate depending on the purpose of the cured film to be obtained from the composition. If the content of the siloxane oligomer (C) is high, the content of the fluorine compound (D) is low so that the refractive index of the cured film can be high and that the antifouling properties can be low. If the content of the siloxane oligomer (C) is low, the strength of the cured film can be low so that the scratch resistance can also be low. From these points of view, the ratio of the solid amount of the siloxane oligomer (C) to the total solid amount of the siloxane oligomer (C) and the fluorine compound (D) is generally preferably from 5 to 90% by weight, more preferably from 30 to 75% by weight.

The curable resin composition may contain a cross-linkable compound. Examples of the cross-linkable compound include melamine resins, glycols, acrylic resins, azides, and isocyanates. In particular, melamine resins such as methylolated melamine, alkoxymethylated melamine and derivatives thereof are preferred in view of the storage stability of the curable resin composition. The cross-linkable compound is preferably used in an amount of 70 parts by weight or less, more preferably of 30 parts by weight or less, still more preferably of 5 to 30 parts by weight, based on 100 parts by weight of the fluorine compound (D).

The curable resin composition may contain an acid generator. It is preferred that the acid generator is uniformly dissolved in the curable resin composition and fails to decompose the curable resin composition or to reduce the transparency of the cured film. Examples of the acid generator include organic acids such as p-toluenesulfonic acid and benzoic acid; and photo-acid generators such as triazine compounds. The acid generator is preferably used in an amount of 10 parts by weight or less, more preferably of 5 parts by weight or less, still more preferably of 0.1 to 5 parts by weight, based on 100 parts by weight of the fluorine compound (D).

An inorganic sol may be added to the antireflection layer-forming material in order to increase the film strength. The inorganic sol preferably has an average particle size of 2 to 50 nm, more preferably of 5 to 30 nm. Examples of the inorganic sol include silica sol, alumina sol, titania sol, zirconia sol, magnesium fluoride sol, and ceria sol. In particular, silica sol is preferred. The content of the inorganic sol in the total solid of the antireflection layer-forming material may be 80% by weight or less, preferably from 10 to 80% by weight.

While antireflection layer-forming materials for use in wet processes have been described above, the antireflection layer may be formed using a dry process. Titanium oxide, zirconium oxide, silicon oxide, magnesium fluoride, or the like may be used for the antireflection layer-forming material. For more significant production of the antireflection function, a laminate of a titanium oxide layer and a silicon oxide layer is preferably used. An appropriate optical design for the laminate can uniformly reduce reflection in the wavelength range of visible light (380 to 780 nm). However, the antireflection layer-forming material for the part to be in direct contact with the hard coating layer should comprise the siloxane component-containing compound.

A general mechanism for the antireflection layer is described below. Light incident on an object undergoes reflection on the interface, absorption and scattering in the interior and any other phenomena until it goes through the object and reaches the back side. Light reflection at the interface between air and a hard coating layer is one of the factors in the reduction in visibility of the image on a display equipped with the hard coating film. The antireflection layer reduces such surface reflection.

The antireflection layer may be a thin optical film that is stacked on the surface of the hard coating layer so as to have strictly controlled thickness and refractive index. In this technique, the antireflection function is produced by allowing opposite phases of incident light and reflected light to cancel each other out based on interference of light.

When the antireflection layer is designed based on interference of light, the interference effect can be enhanced by a method of increasing the difference between the refractive indices of the antireflection layer and the hard coating layer. A laminate of two to five thin optical films (each with strictly controlled thickness and refractive index) may be stacked on a substrate to form an antireflection multilayer. In such a case, components of different refractive indices are generally used to form a plurality of layers with a certain thickness. Thus, the antireflection layer can be optically designed at a higher degree of freedom, the antireflection effect can be enhanced, and it may be possible to make the spectral reflection characteristics flat in the visible light range. Since each layer of the thin optical film is required to be precise in thickness, a dry process such as vacuum deposition, sputtering, and CVD is generally used to form each layer.

The antireflection effect can also be produced by stacking a thin monolayer optical film on the hard coating layer substrate. In the design of a single antireflection layer, the difference between the refractive indices of the antireflection layer and the hard coating layer should be large for the maximum antireflection function. Concerning the thickness (d) of the antireflection layer, the refractive index (n) and the wavelength ($\lambda$) of incident light, the relation $nd=\lambda/4$ is established. If the antireflection layer is a low-refractive-index layer having a refractive index lower than that of the substrate, its reflectance can be minimum under the conditions that the relation should be established. For example, if the refractive index of the antireflection layer is 1.45, the antireflection layer with a thickness of 95 nm can have a minimum reflectance at a wavelength of 550 nm with respect to an incident beam of visible light.

The antireflection function should be produced in the visible light wavelength range of 380 to 780 nm, and the visibility is particularly high in the wavelength range of 450 to 650 nm. The layer is generally designed to have a minimum reflectance at the center wavelength 550 nm of the range.

In the design of a single antireflection layer, its thickness accuracy may be less strict than that of the antireflection multilayer and may be in the range of the design thickness ±10%. In a case where the design thickness is 95 nm, for example, the layer with a thickness in the range of 86 nm to 105 nm can be used without problems. Thus, a single antireflection layer is generally formed using a wet process such as fountain coating, die coating, spin coating, spray coating, gravure coating, roll coating, and bar coating. In the coating process, the antireflection layer-forming material may be diluted with a general solvent such as toluene, ethyl acetate, butyl acetate, methyl ethyl ketone, methyl isobutyl ketone, isopropyl alcohol, and ethyl alcohol or may be applied without being diluted.

The temperature at which drying and curing are performed in the process of forming the antireflection layer is generally, but not limited to, from 60 to 150° C., preferably from 70 to 130° C. The drying and curing is generally performed for 1 to 30 minutes, preferably for about 1 to about 10 minutes in view of productivity. After the drying and curing, an additional heating process may be performed so that an antireflection hard coating film with a higher hardness can be obtained. The temperature of the heating process is generally, but not limited to, from 40 to 130° C., preferably from 50 to 100° C., and the time of the heating process is generally from 1 minute to 100 hours, preferably 10 hours or more, in order to improve the scratch resistance, while the temperature and the time are not limited to the above range and may be controlled as appropriate. The heating method may appropriately employ a hot plate, an oven, a belt furnace, or the like.

The ultrafine particles used as the material for forming the antireflection layer, hollow spherical silicon oxide ultrafine particles are preferably used. The hollow spherical silicon oxide ultrafine particles preferably have an average particle size of 5 to 300 nm. Such ultrafine particles are like hollow spheres each comprising a pore-containing outer shell in which a hollow is formed. The hollow may contain a solvent and/or a gas which are left after the fine particles are prepared. A precursor substance for forming the hollow is preferably left in the hollow. The thickness of the outer shell is preferably in the range of about 1 to about 50 nm and in the range of $1/50$ to $1/5$ of the average particle size. The outer shell preferably comprises a plurality of coating layers. The pore is preferably blocked, and the hollow is preferably sealed with the outer shell. The antireflection layer holding a porous structure or a hollow can have a reduced refractive index and thus is preferably used.

The hollow spherical silicon oxide ultrafine particles should have an average particle size of about in the range of 5 to 300 nm. If the average particle size is less than 5 nm, the volume fraction of the outer shell in the spherical fine particles can be higher and thus the volume fraction of the hollow can be lower. If the average particle size is more than 300 nm, it may be difficult to prepare a stable dispersion, and the ultrafine particle-containing antireflection layer can tend to have reduced transparency. The hollow spherical silicon oxide ultrafine particles preferably have an average particle size in the range of 10 to 200 nm. The average particle size may be determined by dynamic light scattering.

For example, a method of producing hollow spherical silicon oxide ultrafine particles includes the steps (a) to (c) as described below. The hollow spherical silicon oxide ultrafine particles may be prepared in the form of a dispersion. For example, the method of producing such hollow spherical silicon oxide ultrafine particles is preferably a method of producing silica fine particles as disclosed in JP-A No. 2000-233611. Specifically, the method includes the step of:

(a) simultaneously adding an aqueous silicate solution and/or an acidic silicic acid solution and an aqueous solution of an alkali-soluble inorganic compound to an aqueous alkali solution with a pH of 10 or more or an aqueous alkali solution with a pH of 10 or more in which seed particles are optionally dispersed, in order to form a dispersion of core particles with a $MO_x/SiO_2$ molar ratio of 0.3 to 1.0, wherein $SiO_2$ represents silicon oxide, and $MO_x$ represents inorganic compounds other than silicon oxide;

(b) adding a source of silicon oxide to the dispersion of core particles to form a first silicon oxide coating layer on the core particles; and (c) adding an acid to the dispersion so as to partially or entirely remove an element constituting the core particles.

A dispersion of the hollow spherical silicon oxide ultrafine particles may be mixed with any type of matrix component to form an antireflection coating liquid. The term "any type of matrix component" refers to any component capable of forming a coating film on the surface of the hard coating layer. The matrix may be selected and used from resins and the like satisfying the requirements for adhesion to the substrate, hardness, coating properties, and the like. Examples of such a matrix include conventional organic resins such as polyester resins, acrylic resins, urethane resins, vinyl chloride resins, epoxy resins, melamine resins, fluororesins, silicone resins, butyral resins, phenol resins, vinyl acetate resins, UV-curable resins, electron beam-curable resins, emulsion resins, water-soluble resins, hydrophilic resins, any mixtures thereof, any copolymers thereof, and any modifications thereof. The hydrolyzable organic silicon compounds as illustrated for the single antireflection layer may also be used as the matrix component.

When the organic resin is used as the matrix component, for example, the matrix and an organic solvent dispersion of hollow spherical silicon oxide ultrafine particles, which uses an organic solvent such as an alcohol in place of water as a dispersion medium, or the matrix and an organic solvent dispersion of the ultrafine particles which has been optionally treated with any conventional coupling agent are diluted with any appropriate organic solvent to form an antireflection coating liquid.

When the hydrolyzable organic silicon compound is used as the matrix component, for example, water and a catalyst of an acid or alkali are added to a liquid mixture of an alkoxysilane and an alcohol to form a partially hydrolyzed product of the alkoxysilane, which is then mixed with the above-mentioned dispersion and optionally diluted with an organic solvent to form a coating liquid.

In the coating liquid, the weight ratio of the silicon oxide ultrafine particles to the matrix component is preferably in the range of 1:99 to 9:1. If the weight ratio exceeds 9:1, the antireflection layer can be insufficient in strength and impractical in some cases. If the weight ratio is less than 1:99, the addition of the silicon oxide ultrafine particles cannot be so effective in some cases.

The refractive index of the antireflection layer formed on the surface of the hard coating layer may be as low as from 1.2 to 1.42 depending on the mixture ratio between the silicon oxide ultrafine particles and the matrix component, or the like and the refractive index of the matrix used. The refractive index of the silicon oxide ultrafine particles themselves may be from 1.2 to 1.38 in the invention.

The antireflection hard coating film comprising the antireflection layer formed on the hard coating layer of the hard coating film is preferred in terms of pencil hardness. The surface of the hard coating layer containing ultrafine particles has fine irregularities, which may have an effect on pencil drawing (the pencil can tend to scratch the surface, and the force can tend to be exerted).

The antireflection layer may be more frequently attached to the uppermost surface of image displays and thus tends to receive stains from the external environment. Particularly, general stains such as fingerprint, thumbmark, sweat, and hair dressing are frequently left. The stain deposit can change the surface reflectance or stand out whitely to make the displayed content unclear. Such stains can be more noticeable on the layer than on a simple transparent plate or the like. In such a case, a fluoro-silane compound, a fluoro-organic compound or the like may be layered on the antireflection layer in order to impart the function of anti-deposition or easy elimination.

In fabrication of a hard coating film and an antireflection hard coating film, adherence can be improved between a transparent plastic film substrate and a hard coating layer, and between a hard coating layer and an antireflection layer by applying various kinds of surface treatments to the transparent plastic film substrate and the hard coating layer. The surface treatment may be low-pressure plasma treatment, ultraviolet radiation treatment, corona treatment, flame treatment, or acid or alkali treatment. When triacetyl cellulose is used for the film substrate, alkali saponification treatment as specifically described below is preferably used. The surface of the cellulose ester film is preferably subjected to cycles of immersing in an alkali solution and then washing with water and drying. The alkali solution may be a potassium hydroxide solution or a sodium hydroxide solution, and the normal concentration of the hydroxide ion is preferably from 0.1 N to 3.0 N, more preferably from 0.5 N to 2.0 N. The temperature of the alkali solution is preferably in the range of 25° C. to 90° C., more preferably of 40° C. to 70° C. Thereafter, washing with water and drying are performed so that surface-treated triacetyl cellulose can be obtained.

An antireflection hard coating film can be used usually by adhering a transparent plastic film substrate side thereof to surfaces of CRT, LCD, PDP and ELD with a pressure-sensitive adhesive or an adhesive interposed therebetween.

The film substrate side of the hard coating film or the antireflection hard coating film is generally adhered to an optical element for use in a LCD or ELD via a pressure-sensitive adhesive or an adhesive. Before the adhering, the transparent plastic film substrate may also be subjected to the surface treatment as described above.

For example, the optical element is a polarizer or a polarizing plate. A polarizing plate comprising a polarizer and a transparent protective film formed on one or both sides of the polarizer is commonly used. If the transparent protective film is formed on both sides of the polarizer, the front and rear transparent protective films may be made of the same material or different materials. Polarizing plates are generally placed on both sides of a liquid crystal cell. Polarizing plates may be arranged such that the absorption axes of two polarizing plates are substantially perpendicular to each other.

The polarizer is not especially limited but various kinds may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type alignment films, such as dehydrated polyvinyl alcohol and dehydrochlorinated polyvinyl chloride, etc. may be mentioned. In these, a polyvinyl alcohol type film on which dichromatic materials (iodine, dyes) is absorbed and aligned after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

The polarizer is usually as a polarizing plate in which a transparent protective film is formed on one or both sides of the polarizer. The transparent protective preferably has good transparency, mechanical strength, thermal stability, moisture-blocking properties, isotropy, or the like. Examples of the material for the transparent protective film exemplifies a film comprising a transparent resin include polyester resins such as polyethylene terephthalate and polyethylene naphthalate; cellulose resins such as diacetyl cellulose and triacetyl cellulose; acrylic resins such as poly(methyl methacrylate); styrene-based resins such as polystyrene, acrylonitrile-styrene copolymers, styrene resins, acrylonitrile-styrene resins, acrylonitrile-butadiene-styrene resins, acrylonitrile-ethylene-styrene resins, styrene-maleimide copolymers, and styrene-maleic anhydride copolymers; or polycarbonate resins. The transparent protective film may be exemplifies a film comprising a transparent resin include a olefin resin such as polyethylene, polypropylene, cyclo or norbornene structure containing polyolefin resin, an ethylene-propylene copolymer; a vinyl chloride resin, or an amide resin such as nylon and aromatic polyamide. The transparent protective film may be exemplifies a film comprising a transparent resin include an imide resin such as aromatic polyimide and polyimide amide, a sulfone resin, a polyethersulfone resin, a polyetheretherketone resin, a polyphenylene sulfide rein, a vinyl alcohol resin, a vinylidene chloride resin, a vinyl butyral resin, an arylate resin, a polyoxymethylene resin, an epoxy resin, or any blend of the above resins.

Moreover, as is described in JP A No. 2001-343529 (WO 01/37007), polymer films, for example, resin compositions including (A) thermoplastic resins having substituted and/or non-substituted imide group is in side chain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used. These films exhibit small retardations and small photoelastic coefficients and thus can eliminate defects such as unevenness due to distortion when used in a protective film for a polarizing plate or the like. These films also have low moisture permeability and thus have high durability against moistening.

In terms of polarizing properties, durability and the like, cellulose resins such as triacetyl cellulose and norbornene resins are preferably used for the transparent protective film. Specific examples of such resins include FUJITAC (trade name) manufactured by Fuji Photo Film Co., Ltd., ZEONOA (trade name) manufactured by Nippon Zeon Co., Ltd. and ARTON (trade name) manufactured by JSR Corporation.

A thickness of the transparent protective film is determined appropriately, and in general, it is about in the range of 1 to 500 μm so that it may have suitable thinness, or in viewpoint of workability, such as strength and handling property. Especially it is preferably 5 to 200 μm, and more preferably 10 to 150 μm. In the above range, the transparent protective film can mechanically protect a polarizer and can prevent a polarizer from shrinking and retain stable optical properties even when exposed to high temperature and high humidity.

It is preferred that the degree of the coloration of the transparent protective film is as little as possible. Accordingly, it is preferred to use a protective film wherein a retardation value in the film thickness direction, which is represented by $Rth=(nx-nz)\cdot d$ wherein nx represent refractive indices of the film of the slow axis direction in its plane, nz represents a refractive index of the film in the thickness direction thereof, and d represents a thickness of the film, is from −90 to +75 nm. The use of the film wherein the retardation value (Rth) in the thickness direction is from −90 nm to +75 nm makes it possible to overcome substantially the coloration (optical coloration) of the polarizing plate, resulting from the protective film. The retardation value (Rth) in the thickness direction is more preferably from −80 nm to +60 nm, more preferably from −70 nm to +45 nm.

The in-plane retardation value of the transparent protective film and the retardation value in the thickness direction of the transparent protective film can affect the viewing angle properties of liquid crystal displays. Thus, it is preferable to use a transparent protective film with an optimized retardation value. It should be noted that the transparent protective film stacked on a polarizer surface close to a liquid crystal cell should have an optimized retardation value, while that stacked on a polarizer surface far away from the liquid crystal cell does not affect the optical properties of the liquid crystal display and thus does not need to have an optimized retardation value.

The transparent protective film stacked on a polarizer surface close to a liquid crystal cell preferably has an in-plane retardation value (Re: $(nx-ny) \cdot d$) of 0 to 5 nm, more preferably of 0 to 3 nm, still more preferably of 0 to 1 nm. Its retardation value in its thickness direction (Rth) is preferably from 0 to 15 nm, more preferably from 0 to 12 nm, still more preferably from 0 to 10 nm, particularly preferably from 0 to 5 nm, most preferably from 0 to 3 nm.

The polarizing plate in which the hard coating film or the like is stacked may be a laminate of the hard coating film or the like, the transparent protective film, the polarizer, and the transparent protective film in this order or a laminate of the hard coating film or the like, the polarizer and the transparent protective film in this order.

In addition, the transparent protective film surface to which the polarizer is not adhered may be provided with a hard coating layer or subjected to anti-sticking treatment. The hard-coating treatment is performed in order to prevent scratching of the polarizing plate surface. In the process of forming the hard coating layer, for example, a cured film with high hardness, good sliding characteristics and the like may be formed on the surface of the transparent protective film by using an appropriate UV-curable resin such as an acrylic resin and a silicone resin. The anti-sticking treatment is performed in order to prevent adhesion to the adjacent layer. The hard coating layer, the anti-sticking layer or the like may be formed as being the transparent protective film itself or may be provided as an independent optical layer separately from the transparent protective film.

A hard coating layer, a primer layer, an adhesive layer, a pressure-sensitive adhesive layer, an antistatic layer, an electrically-conductive layer, a gas barrier layer, a water vapor-blocking layer, a moisture-blocking layer, or the like may also be placed between the layers of a polarizing plate or on the surface of a polarizing plate. At the stage of forming each layer of the polarizing plate, electrically-conductive particles, an antistatic agent, various types of fine particles, a plasticizer, or the like may also be added to or mixed with the material for each layer to modify it as needed.

Any method may be used to laminate the transparent protective film and the polarizer. For example, the protective film and the polarizer may be laminated through an adhesive comprising an acrylic polymer or a vinyl alcohol polymer or an adhesive comprising at least a water-soluble crosslinking agent for a vinyl alcohol polymer, such as boric acid, borax, glutaraldehyde, melamine, and oxalic acid, so that the resulting protective layer can be resistant to peeling due to humidity or heat and can have high light transmittance or high degree of polarization. A polyvinyl alcohol adhesive is preferably used because of its good adhesion to the polarizer material, polyvinyl alcohol.

Pressure-sensitive adhesives that have high transparency and low birefringence and can exhibit sufficient adhesive strength in the form of a thin layer are preferably used to laminate the polarizer and the transparent protective film of the norbornene resin-containing polymer film. Such a pressure-sensitive adhesive may be a dry laminating adhesive using a mixture of a polyurethane resin solution and a polyisocyanate resin solution, a styrene-butadiene rubber adhesive, or a two-part curable epoxy adhesive such as two components of an epoxy resin and polythiol and two components of an epoxy resin and polyamide. In particular, solvent type adhesives or two-part curable epoxy adhesives are preferred, and transparent adhesives are preferred. The adhesive force can be improved using an appropriate adhesive primer depending on the type of adhesives, and in the case of using such an adhesive; a certain adhesive primer is preferably used.

Any adhesive primer may be used as long as its layer can improve the adhesion properties. For example, the adhesive primer may be a so-called coupling agent such as a silane coupling agent having a hydrolyzable alkoxysilyl group and a reactive functional group such as amino, vinyl, epoxy, mercapto, and chloro in the same molecule, a titanate coupling agent having an organic functional group and a titanium-containing hydrolyzable hydrophilic group in the same molecule, and an aluminate coupling agent having an organic functional group and an aluminum-containing hydrolyzable hydrophilic group in the same molecule; or a resin having an organic reactive group, such as an epoxy resin, an isocyanate resin, a urethane resin, and an ester urethane resin. In particular, the silane coupling agent-containing layer is preferred, because it is easy to handle industrially.

An optical element is used as an optical film in which the polarizing plate is laminated with an additional optical element (optical layer) in a practical use. No specific limitation is placed on an additional optical layer, and there can be used one optical layer, or two optical layers or more that is used in formation of a liquid crystal display or the like such as a retardation plate (including ½ or ¼ wavelength plate). Especially preferable is a polarizing plate obtained by further laminating a brightness enhancement film on a polarizing plate. In particular, a reflection type polarizing plate or a transflective type polarizing plate in which a reflection plate or a transflective reflection plate is further laminated on a polarizing plate, an elliptically polarizing plate or a circular polarizing plate in which a retardation plate is laminated on a polarizing plate, a wide viewing angle polarizing plate in which a viewing angle compensation film is further laminated on a polarizing plate, or a polarizing plate in which a brightness enhancement film is further laminated on a polarizing plate is preferable. When it is used the elliptically polarizing plate, or the polarizing plate having optical compensation, the hard coating film is formed in the side of the polarizing plate.

Furthermore, if needed, there may also be given treatments for giving various characteristics, various functions, etc., such as scratch-proof property, durability, weatherability, wet heat resistance, heat resistance, moisture resistance, water vapor permeability, antistatic property, conductivity, improvement in adhesion between layers, and improvement in mechanical strength, or insertion, lamination of functional layers, etc.

A reflection-type polarizing plate is a plate in which a reflection layer is provided on a polarizing plate, is for forming a liquid crystal display which is a type of reflecting and displaying incident light from a visible side (display side), and has an advantage that building-in of a light source such as back light can be omitted, and a liquid crystal display is easily thinned. Formation of a reflection-type polarizing plate can be performed by an appropriate format such as a format of providing a reflection layer comprising a metal on one side of a polarizing plate via a transparent protecting layer, if necessary.

As an example of a reflective type polarizing plate, a plate may be mentioned on which, if required, a reflective layer is formed using a method of attaching a foil and vapor deposition film of high-reflectance metals, such as aluminum, to one side of a matte treated protective film.

A reflection plate may be used by a reflection sheet on which a reflection layer is provided on an appropriate film like a transparent protecting film in place of a format of directly imparting to the transparent film of a polarizing plate. Since a reflection layer is usually made of a metal, a use aspect in the state where its reflection side is covered with a transparent protecting film or a polarizing plate is more preferable from a viewpoint of prevention of reduction in a reflectivity due to oxidation, consequently long term durability of an initial reflectivity, and avoidance of separate provision of a protecting layer.

A transflective polarizing plate can be obtained by adopting a transflective type reflection layer such as a half mirror which reflects light on a reflection layer and permeates light in the aforementioned plate. The transflective polarizing plate is usually provided on a back side of a liquid crystal cell, and such a type of a liquid crystal display can be formed that, when a liquid crystal display is used in the relatively light atmosphere, incident light from a visible side (display side) is reflected to display an image and, in the relatively dark atmosphere, an image is displayed using a built-in light source such as back light built in a back side of a transflective polarizing plate. That is, the transflective polarizing plate is useful for forming such a type of a liquid crystal display that energy which is used in a light source such as back light can be saved, and the device can be used using a built-in light source also under the relatively dark atmosphere.

An elliptically polarizing plate or a circular plate in which a retardation plate is further laminated on a polarizing plate will be explained. When a linearly polarized light is changed to elliptically polarized light or a circularly polarized light, or elliptically polarized light or circularly polarized light is changed to linearly polarized light, or a polarization direction of linearly polarized light is changed, a retardation plate is used. In particular, as a retardation plate for changing linearly polarized light to circularly polarized light, or changing circularly polarized light to linearly polarized light, a so-called ¼ wavelength plate (also referred to as λ/4 plate) is used. A ½ wavelength plate (also referred to as λ/2 plate) is usually used when a polarization direction of linearly polarized light is changed.

Elliptically polarizing plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflective type liquid crystal display that provides a colored picture, and it also has function of antireflection. For example, a retardation plate may be used that compensates coloring and viewing angle, etc. caused by birefringence of various wavelength plates or liquid crystal layers etc. Besides, optical characteristics, such as retardation, may be controlled using laminated layer with two or more sorts of retardation plates having suitable retardation value according to each purpose. As retardation plates, birefringence films formed by stretching films comprising suitable polymers, such as polycarbonates, polyvinyl alcohols, polystyrenes, poly methyl methacrylates, polypropylene or the other polyolefin; polyarylates and polyamides; oriented films comprising liquid crystal materials, such as liquid crystal polymer; and films on which an alignment layer of a liquid crystal material is supported may be mentioned. A retardation plate may be a retardation plate that has a proper retardation according to the purposes of use, such as various kinds of wavelength plates and plates aiming at compensation of coloring by birefringence of a liquid crystal layer and of viewing angle, etc., and may be a retardation plate in which two or more sorts of retardation plates is laminated so that optical properties, such as retardation, may be controlled.

The aforementioned elliptically polarizing plate or reflection-type elliptically polarizing plate is such that an appropriate combination of a polarizing plate or a reflection-type polarizing plate and a retardation plate is laminated. Such the elliptically polarization plate can be formed by successively and separately laminating a (reflection-type) polarizing plate and a retardation plate in a process for manufacturing a liquid crystal display so that a combination of the (reflection-type) polarizing plate and the retardation plate is obtained, and an optical film such as an elliptically polarizing plate which has been formed in advance as described above has an advantage that it is excellent in stability of quality and laminating workability, and an efficiency of manufacturing a liquid crystal display can be improved.

A viewing angle compensation film is a film for extending a viewing angle so that an image is seen relatively clearly even when a screen of a liquid crystal display is seen not from a direction vertical to the screen but from a slightly oblique direction. Such the viewing angle compensating retardation plate is such that an orientation layer of a liquid crystal polymer is supported on a retardation plate, an oriented film such as a liquid crystal polymer, or a transparent substrate. In a normal retardation plate, a polymer film having birefringence which has been uniaxially stretched in its in-plane direction is used, while in a retardation plate used as a viewing angle compensation film, a bidirectional stretched film such as a polymer film having birefringence which has been biaxially stretched in-plane direction, a polymer having birefringence which has been uniaxially stretched in-plane direction, is also stretched, and also stretched in a thickness direction, and has a controlled refractive index in a thickness direction, and a tilt oriented film is used. Examples of the tilt oriented film include a film obtained by adhering a thermally shrinking film to a polymer film, and subjecting the polymer film to stretching treatment or/and shrinking treatment under action of a shrinking force due to heating, and a film in which a liquid crystal polymer is tilt oriented. As a raw material polymer for a retardation plate, the same polymer as that explained for the previous retardation plate is used, and an appropriate polymer for the purpose of preventing coloration due to change in a visual confirmation angle based on a retardation due to a liquid crystal cell, or extending a viewing angle for better visual confirmation can be used.

In addition, from a viewpoint of accomplishment of a wide viewing angle for better visual confirmation, an optical compensation retardation plate in which an optically anisotropic layer comprising an oriented layer of a liquid crystal polymer, in particular, a tilt oriented layer of a discotic liquid crystal polymer is supported by a triacetylcellulose film can be preferably used.

A polarizing plate in which a polarizing plate and a brightness enhancement film are laminated is usually used by provision on a back side of a liquid crystal cell. The brightness enhancement film exhibits such the property that, when natural light is introduced by back light of a liquid crystal display, or reflection from a back side, linearly polarized light having a prescribed polarization axis or circularly polarized light in a prescribed direction is reflected, and other light is permeated. In a polarizing plate in which the brightness enhancement film is laminated on a polarizing plate, light from a light source such as back light is introduced to obtain permeated light in the prescribed polarized state and, at the same time, light other than the aforementioned prescribed polarized state is reflected without permeation. Light reflected on a surface of this brightness enhancement film is inverted via a reflection layer provided on its rear side to introduce into the brightness enhancement film again, a part or all of this is permeated as light in the prescribed polarized state to increase an amount of light permeating through the brightness enhancement film and, at the same time, polarized light which is absorbed in a polarizer with difficulty is supplied to increase an amount of light which can be utilized in a liquid crystal display image display, thereby, a luminance can be improved. That is, when light is introduced through a polarizer from a back side of a liquid crystal cell by back light without using the brightness enhancement film, most of light having a polarization direction which is not consistent with a polarization axis of a polarizer is absorbed in a polarizer, and is not permeated through a polarizer. That is, different depending on property of a used polarizer, about 50% of light is absorbed in a polarizer, an amount of light which can be utilized in a liquid crystal image display is reduced by that portion, and an image is darkened. Since the brightness enhancement film does not introduce light having such a polarization direction that it is absorbed in a polarizer, into a polarizer, once reflects on the brightness enhancement film, and inverts the light via a reflection layer provided on its rear side to introduce into the brightness enhancement film again, these are repeated, and the brightness enhancement film makes only polarized light that a polarization direction of light reflecting and inverting between both of them becomes a polarization direction capable of permeating through a polarizer, permeate therethrough, supplies this to a polarizer, light such as back light can be effectively used for displaying an image of a liquid crystal display, and a screen can be made bright.

A diffusion plate may also be prepared between the brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy; an aligned film of cholesteric liquid-crystal layer; a film that has the characteristics of reflecting a circularly polarized light with either left-handed or right-handed rotation and transmitting other light, such as a film on which the aligned cholesteric liquid crystal layer is supported; etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multi-layered film of laminated layers of a polarizing plate and two of more of optical layers as the above-mentioned separated type polarizing plate. Therefore, a polarizing plate may be a reflective type elliptically polarizing plate or a semi-transmission type elliptically polarizing plate, etc. in which the above-mentioned reflective type polarizing plate or a transflective type polarizing plate is combined with above described retardation plate respectively.

Although a laminating of the above described hard coating film to the optical element may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

Although the hard coating film is provided on at least one side of the optical film element such as the polarizing plate mentioned above or the optical film comprising at least polarizing plate laminated, on the other side not prepared the hard coating film, an pressure-sensitive adhesive layer may also be prepared for adhesion with other members, such as a liquid crystal cell etc. As pressure-sensitive adhesive that forms pressure-sensitive adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives may be preferably used, which is excellent in optical transparency, showing adhesion characteristics with moderate wettability, cohesiveness and adhesive property and has outstanding weather resistance, heat resistance, etc.

Moreover, an pressure-sensitive adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The adhesive layer or pressure-sensitive adhesive layer may contain additives, for example, such as natural or synthetic resins, tackifier resins, glass fibers, glass beads, metal powder, fillers comprising other inorganic powder etc., pigments, colorants and antioxidants. Moreover, it may be a pressure-sensitive adhesive layer that contains fine particle and shows optical diffusion nature.

Proper method may be carried out to attach an pressure-sensitive adhesive layer to the optical element such as the polarizing plate and the optical film. As an example, about 10 to 40 weight % of the pressure-sensitive adhesive solution in which a base polymer or its composition is dissolved or dispersed, for example, toluene or ethyl acetate or a mixed solvent of these two solvents is prepared. A method in which this solution is directly applied on the optical element using suitable developing methods, such as flow method and coating method, or a method in which an pressure-sensitive adhesive layer is once formed on a separator, as mentioned above, and is then transferred on the optical element, may be mentioned. A pressure-sensitive adhesive layer may also be prepared on each layer as a layer in which pressure-sensitive adhesives with different composition or different kind etc. are laminated together. Thickness of a pressure-sensitive adhesive layer may be suitably determined depending on a purpose of usage or adhesive strength, etc., and generally is 1 to 500 μm, preferably 5 to 200 μm, and more preferably 10 to 100 μm.

A temporary separator is attached to an exposed side of an pressure-sensitive adhesive layer to prevent contamination etc., until it is practically used. Thereby, it can be prevented that foreign matter contacts pressure-sensitive adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer, such as a polarizer, a transparent protective film and an optical layer etc. forming the optical layer element and a adhesive layer, using a method of adding UV absorbents, such as salicylic acid ester type compounds, benzophenol type compounds, benzotriazol type compounds, cyano acrylate type compounds, and nickel complex salt type compounds.

An optical element comprising the hard coating film of the present invention may be preferably used for manufacturing various equipments, such as liquid crystal display, etc. Assembling of a liquid crystal display may be carried out according to conventional methods. That is, a liquid crystal display is generally manufactured by suitably assembling several parts such as a liquid crystal cell, optical films and, if necessity, lighting system, and by incorporating driving circuit. In the present invention, except that an optical element by the present invention is used, there is especially no limitation to use any conventional methods. Also any liquid crystal cell of arbitrary type, such as TN type, and STN type, n type may be used.

Suitable liquid crystal displays, such as liquid crystal display with which the above-mentioned optical element has been located at one side or both sides of the liquid crystal cell, and with which a backlight or a reflector is used for a lighting system may be manufactured. In this case, the optical element by the present invention may be installed in one side or both sides of the liquid crystal cell. When installing the optical elements in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic luminescence layer and a metal electrode are laminated on a transparent substrate in an order configuring an illuminant (organic electro luminescence illuminant). Here, an organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in an intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarizing plate, while preparing the polarizing plate on the surface side of the transparent electrode.

Since the retardation plate and the polarizing plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarizing plate and the retardation plate is adjusted to $\pi/4$, the mirror surface of the metal electrode may be completely covered.

This means that only linearly polarized light component of the external light that enters as incident light into this organic EL display is transmitted with the work of polarizing plate. This linearly polarized light generally gives an elliptically polarized light by the retardation plate, and especially the retardation plate is a quarter wavelength plate, and moreover when the angle between the two polarization directions of the polarizing plate and the retardation plate is adjusted to π/4, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarizing plate, it cannot be transmitted through the polarizing plate. As the result, mirror surface of the metal electrode may be completely covered.

EXAMPLES

Description will be given of examples of the invention below. Note that "part or parts" and "%" means units based on weight unless otherwise specified.

Example 1

(Transparent Plastic Film Substrate)

Used as the substrate was a triacetyl cellulose film having a refractive index of 1.48 and a thickness of 80 μm.
(Reactive Silicone (B))

A compound (PC-4131, manufactured by Dainippon Ink and Chemicals, Incorporated) was used in which a dimethylsiloxane unit, a methyl, 3-acryloyl-2-hydroxypropoxypropyl siloxane unit, and a methyl, 2-acryloyl-3-hydroxypropoxypropyl siloxane unit were copolymerized in a molar ratio of 100:20:5. The compound was named as reactive silicone (B1), which corresponds to a compound having the units represented by formulae (1), (2) and (3), respectively. Reactive silicone (B1) had a weight average molecular weight in the range of 1000 to 20000. The weight average molecular weight was measured under the following GPC conditions: measuring apparatus, HLC-8120GPC manufactured by Tosoh Corporation; column, G4000$H_{XL}$+G2000$H_{XL}$+G1000$H_{XL}$ (each 7.8 mmφ×30 cm, 90 cm in total) manufactured by Tosoh Corporation; column temperature, 40° C.; eluent, tetrahydrofuran; flow rate, 0.8 ml/minute; inlet pressure, 6.6 MPa; standard sample, polystyrene.
(Hard Coating Layer-Forming Material)

A hundred parts of dipentaerythritol hexaacrylate and 9.3 parts of butanediol diglycerine ether diacrylate were used as curable compounds (A1). The curable compounds (A1), 0.5 parts of the reactive silicone (B1) and 4.5 parts of a polymerization initiator (Irgacure 184, manufactured by Ciba Specialty Chemicals Inc.) were diluted with butyl acetate such that a solids content of 65% was reached, and as a result, a material (solution) for forming a hard coat was prepared, which was named as a hard coating layer-forming material.
(Preparation of Hard-Coated Film)

The hard coating layer-forming material was applied to the surface of the transparent plastic film substrate with a bar coater and heated at 100° C. for 1 minute so that the coating film was dried. The coating film was then cured by irradiation with ultraviolet light in an integrated amount of 300 mJ/cm² from a metal halide lamp, so that a hard-coated film having a 7 μm-thick hard coating layer was obtained. The hard coating layer had a refractive index of 1.51.
(Antireflection Layer-Forming Material)

Colcoat N103 (2% in solids content, manufactured by Colcoat Co., Ltd.) was used as the siloxane oligomer (C), which was a dimethylsiloxane oligomer with an average molecular weight of 950. Opstar JTA-105 (5% in solids content, manufactured by JSR Corporation) was used as the fluorine compound (D), which had a polystyrene-equivalent number average molecular weight of 8000. JTA-105A (5% in solids content, manufactured by JSR Corporation) was used as a curing agent. A hundred parts of Opstar JTA-105, 1 part of JTA-105A, 590 parts of Colcoat N103, and 151.5 parts of butyl acetate were mixed to form an antireflection layer-forming material.
(Formation of Antireflection Layer The antireflection layer-forming material was applied to the hard coating layer with a wire bar such that a post-curing thickness of about 100 nm would be achieved, and then dried and cured by heating at 120° C. for 3 minutes to form an antireflection layer (0.1 μm in thickness, 1.43 in refractive index) so that an antireflection hard coating film was obtained.

Example 2

An antireflection hard coating film was obtained using the process of Example 1, except that the thickness of the hard coating layer was changed to 20 μm.

Example 3

(Hard Coating Layer-Forming Material)

An ultraviolet radiation-curable resin (Unidic 17-806, manufactured by Dainippon Ink and Chemicals, Incorporated) containing isocyanurate acrylate, pentaerythritol triacrylate, dipentaerythritol hexaacrylate, and isophorone diisocyanate polyurethane was used as a curable compound (A2). A hundred parts of the curable compound (A2), 0.5 parts of the reactive silicone (B1) described in Example 1, and 4.5 parts of a polymerization initiator (Irgacure 184, manufactured by Ciba Specialty Chemicals Inc.) were diluted with butyl acetate such that a solids content of 40% was reached, and as a result, a hard coating layer forming material (solution) was prepared.

An antireflection hard coating film was obtained using the process of Example 1, except that the resulting material was used in place of the hard coating layer-forming material of Example 1.

Example 4

(Reactive Silicone (B))

A compound (PC-4133, manufactured by Dainippon Ink and Chemicals, Incorporated) was used that contained a dimethylsiloxane unit, a methyl, hydroxypropyl siloxane unit, a 6-isocyanate hexyl isocyanurate unit, and an aliphatic polyester unit having a terminal acrylate group, in a molar ratio of 286:45:100:45. The compound was named as reactive silicone (B2), which corresponds to a compound having the units represented by formulae (7), (8), (9), and (10), respectively. The weight average molecular weight of the reactive silicone (B2) was measured under the same conditions as those for the reactive silicone (B1) described above.

An antireflection hard coating film was obtained using the process of Example 3, except that the reactive silicone (B2) was used in place of the reactive silicone (B1) when the hard coating layer-forming material was prepared.

Example 5

(Reactive Silicone (B))

A copolymer (PC-4151, manufactured by Dainippon Ink and Chemicals, Incorporated) was used that contained a dimethylsiloxane unit, a methyl, acrylate group-terminated polyethylene glycol propyl ether siloxane unit, a methyl, hydroxyl group-terminated polyethylene glycol propyl ether siloxane unit, in a molar ratio of 100:8:6. The compound was named as reactive silicone (B3), which corresponds to a compound having the units represented by formulae (1), (4) and (5), respectively. The reactive silicone (B3) had a weight average molecular weight of 4320. The weight average molecular weight of the reactive silicone (B3) was measured under the same conditions as those for the reactive silicone (B1) described above.

An antireflection hard coating film was obtained using the process of Example 3, except that the reactive silicone (B3) was used in place of the reactive silicone (B1) when the hard coating layer-forming material was prepared.

Example 6

An antireflection hard coating film was obtained using the process of Example 5, except that the amount of the addition of the reactive silicone (B3) was changed to 0.01 parts when the hard coating layer-forming material was prepared.

Example 7

An antireflection hard coating film was obtained using the process of Example 5, except that the amount of the addition of the reactive silicone (B3) was changed to 2 parts when the hard coating layer-forming material was prepared.

Example 8

An antireflection hard coating film was obtained using the process of Example 5, except that the thickness of the hard coating layer was changed to 20 μm.

Example 9

The antireflection hard coating film obtained in Example 1 was further heat-treated at 90° C. for 10 hours.

Example 10

The antireflection hard coating film obtained in Example 2 was further heat-treated at 90° C. for 10 hours.

Example 11

(Antireflection Layer-Forming Material)

Colcoat N103 (2% in solids content, manufactured by Colcoat Co., Ltd.) was used as the siloxane oligomer (C), which was a dimethylsiloxane oligomer with an average molecular weight of 950. Opstar JTA-105 (5% in solids content, manufactured by JSR Corporation) was used as the fluorine compound (D), which had a polystyrene-equivalent number average molecular weight of 8000. JTA-105A (5% in solids content, manufactured by JSR Corporation) was used as a curing agent. Into a mixed solvent of isopropyl alcohol, butyl acetate and methyl isobutyl ketone (54:14:32 in weight ratio) were dispersed 23 parts of Opstar JTA-105, 0.2 parts of JTA-105A, 54 parts of Colcoat N103, and 23 parts of hollow spherical silicon oxide ultrafine particles with a diameter of 60 nm that were made hydrophobic by a surface treatment with an acrylic group-containing silane coupling agent, so that an antireflection layer-forming material with an adjusted solids content of 2.0% was obtained.

An antireflection hard coating film was obtained using the process of Example 10, except that the resulting material was used in place of the antireflection layer-forming material of Example 10. The antireflection layer formed had a refractive index of 1.39.

Example 12

The antireflection hard coating film obtained in Example 5 was further heat-treated at 90° C. for 10 hours.

Example 13

The antireflection hard coating film obtained in Example 8 was further heat-treated at 90° C. for 10 hours.

Example 14

An antireflection hard coating film was obtained using the process of Example 5, except that the amount of the addition of the reactive silicone (B3) was changed to 3 parts when the hard coating layer-forming material was prepared.

Example 15

An antireflection hard coating film was obtained using the process of Example 8, except that 60 parts of crosslinked acrylic particles with an average particle size of 3 μm (MX300, manufactured by Soken Chemical & Engineering Co., Ltd.) were added when the hard coating layer-forming material was prepared. The antireflection hard coating film had antiglare properties.

Comparative Example 1

An antireflection hard coating film was obtained using the process of Example 1, except that the reactive silicone (B1) was not added when the hard coating layer-forming material was prepared.

Comparative Example 2

An antireflection hard coating film was obtained using the process of Example 3, except that the reactive silicone (B1) was not added when the hard coating layer-forming material was prepared.

Comparative Example 3

An antireflection hard coating film was obtained using the process of Example 5, except that the amount of the addition of the reactive silicone (B3) was changed to 4 parts when the hard coating layer-forming material was prepared.

Comparative Example 4

An antireflection hard coating film was obtained using the process of Example 3, except that a non-reactive silicone with no (meth)acrylate group (dimethylsiloxane (B4)) was used in place of the reactive silicone (B1) when the hard coating layer-forming material was prepared.

Comparative Example 5

The antireflection hard coating film obtained in Comparative Example 1 was further heat-treated at 90° C. for 10 hours.

Comparative Example 6

The antireflection hard coating film obtained in Comparative Example 2 was further heat-treated at 90° C. for 10 hours.

The following methods were applied in measurement of refractive indices and thickness values concerning the antireflection hard coating films having been fabricated above. In Table 1, there are shown values of the measurement. In Table 1, there are shown respective components included in the hard coating layer-forming materials, the antireflection layer-forming materials.

(Refractive Index)

An Abbe's refractometer manufactured by Atago Co., Ltd. was used to conduct measurement according to the specific instructions indicated on the refractometer wherein measurement light was directed to a measurement surface of a transparent plastic film substrate and a hard coating layer.

(Thickness of Hard Coating Layer)

A thickness gauge (microgauge type manufactured by Mitutoyo Corporation) was used for measurement. Each hard coating film with the hard coating layer formed on the transparent plastic film substrate was measured for thickness, and the thickness of the hard coating layer was calculated by subtracting the thickness of the transparent substrate from the measured thickness.

(Thickness of Antireflection Layer)

An instantaneous multichannel photodetector system (MCPD-2000 (trade name) manufactured by Otsuka Electronics Co., Ltd.) was used, and the thickness was calculated from the waveform data of the resulting interference spectrum.

The following evaluations were conducted on the obtained antireflection hard coating films. In Table 1, there are shown the results.

(Reflectance)

A black acrylic plate manufactured by Mitsubishi Rayon Co., Ltd. (2.0 mm in thickness) was adhered with a pressure-sensitive adhesive about 20 μm in thickness to the antireflection hard coating film surface on which no antireflection layer was formed. The resulting laminate with no reflection from the adhered back side was measured for reflectance of the surface of the antireflection layer. The spectral reflectance (specular reflectance+diffuse reflectance) was measured using a spectrophotometer (UV2400PC with an 8°-inclined integrating sphere, manufactured by Shimadzu Corporation), and the reflectance was calculated according to the formula: C illuminant/total reflection index of 2° visual field (Y value).

(Adhesion)

The surface on which the antireflection layer of the antireflection hard coating film was not formed was bonded to a glass plate with an about 20 μm-thick pressure-sensitive adhesive, and then the surface of the antireflection layer was subjected to the cross-cut peeling test according to JIS K 5400. The result was expressed by the fraction: the number of detached portions/100.

(Pencil Hardness)

The surface on which the antireflection layer of the antireflection hard coating film was not formed was placed on a glass plate, and then the surface of the antireflection layer was subjected to a pencil hardness test according to JIS K-5400 (with a load of 500 g).

(Scratch Resistance)

The antireflection hard coating film was cut into a 25 mm-wide, 100 mm-long piece, and the antireflection layer-free side of the piece was placed on a glass plate. Steel wool #0000 was attached to a smooth cross-section of a cylinder with a diameter of 25 mm. On the surface of the antireflection layer, the steel wool attached to the cylinder was allowed to move forward and backward 10 times at a speed of about 100 mm/second under a load of 400 g. After the test, scratch resistance was visually evaluated using the following criteria:

| | Hard coating layer | | | | Antireflection Layer | | | Evaluations | | | |
| | | | | | Presence | | | | | | |
| | Curable Compound (A) | Refractive Index | Reactive Silicone (B) Type | Amount | Thickness (μm) | or Absence of Hollow Particles | Refractive Index | Heat Treatment | Reflectance (%) | Adhesion | Pencil Hardness | Scratch Resistance |
|---|---|---|---|---|---|---|---|---|---|---|---|---|
| Example 1 | A1 | 1.51 | B1 | 0.5 | 7 | Absent | 1.43 | Absent | 2.4 | 0/100 | 2H | ○ |
| Example 2 | A1 | 1.51 | B1 | 0.5 | 20 | Absent | 1.43 | Absent | 2.4 | 0/100 | 4H | ⊙ |
| Example 3 | A2 | 1.53 | B1 | 0.5 | 7 | Absent | 1.43 | Absent | 2.2 | 0/100 | 2H | ○ |
| Example 4 | A2 | 1.53 | B2 | 0.5 | 7 | Absent | 1.43 | Absent | 2.2 | 0/100 | 2H | ○ |
| Example 5 | A2 | 1.53 | B3 | 0.5 | 7 | Absent | 1.43 | Absent | 2.2 | 0/100 | 2H | ○ |
| Example 6 | A2 | 1.53 | B3 | 0.01 | 7 | Absent | 1.43 | Absent | 2.2 | 0/100 | 2H | Δ |
| Example 7 | A2 | 1.53 | B3 | 2 | 7 | Absent | 1.43 | Absent | 2.2 | 0/100 | 2H | ○ |
| Example 8 | A2 | 1.53 | B3 | 0.5 | 20 | Absent | 1.43 | Absent | 2.2 | 0/100 | 3H | ⊙ |
| Example 9 | A1 | 1.51 | B1 | 0.5 | 7 | Absent | 1.43 | 90° C. × 10 hours | 2.4 | 0/100 | 2H | ⊙ |
| Example 10 | A1 | 1.51 | B1 | 0.5 | 20 | Absent | 1.43 | 90° C. × 10 hours | 2.4 | 0/100 | 4H | ⊙ |
| Example 11 | A1 | 1.51 | B1 | 0.5 | 20 | Present | 1.39 | 90° C. × 10 hours | 1.65 | 0/100 | 4H | ○ |
| Example 12 | A2 | 1.53 | B3 | 0.5 | 7 | Absent | 1.43 | 90° C. × 10 hours | 2.2 | 0/100 | 2H | ⊙ |
| Example 13 | A2 | 1.53 | B3 | 0.5 | 20 | Absent | 1.43 | 90° C. × 10 hours | 2.2 | 0/100 | 3H | ⊙ |
| Example 14 | A2 | 1.53 | B3 | 3 | 7 | Absent | 1.43 | Absent | 2.2 | 0/100 | 2H | Δ |
| Example 15 | A2 | 1.53 | B3 | 0.5 | 20 | Absent | 1.43 | Absent | 2.2 | 0/100 | 4H | ○ |
| Comparative Example 1 | A1 | 1.51 | — | — | 7 | Absent | 1.43 | Absent | 2.4 | 89/100 | 2H | x |
| Comparative Example 2 | A2 | 1.53 | — | — | 7 | Absent | 1.43 | Absent | 2.2 | 68/100 | 2H | x |
| Comparative Example 3 | A2 | 1.53 | B3 | 4 | 7 | Absent | 1.43 | Absent | 2.2 | 0/100 | 2H | x |
| Comparative Example 4 | A2 | 1.53 | B4 | 0.5 | 7 | Absent | 1.43 | Absent | 2.2 | 62/100 | 2H | x |

-continued

| | Hard coating layer | | | | Antireflection Layer | | | Evaluations | | | |
|---|---|---|---|---|---|---|---|---|---|---|---|
| | Curable Compound (A) | Refractive Index | Reactive Silicone (B) | | Thickness (µm) | Presence or Absence of Hollow Particles | Refractive Index | Heat Treatment | Reflectance (%) | Adhesion | Pencil Hardness | Scratch Resistance |
| | | | Type | Amount | | | | | | | | |
| Comparative Example 5 | A1 | 1.51 | — | — | 7 | Absent | 1.43 | 90° C. × 10 hours | 2.4 | 92/100 | 2H | Δ |
| Comparative Example 6 | A2 | 1.53 | — | — | 7 | Absent | 1.43 | 90° C. × 10 hours | 2.2 | 54/100 | 2H | Δ |

⊙: no scratch
○: a few small scratches with no influence on visibility
Δ: small scratches with no influence on visibility
x: significant scratches and a reduction in visibility

The invention claimed is:

1. An antireflection hard coating film comprising:
a transparent plastic film substrate; and
at least one hard coating layer of a cured coating layer and at least one antireflection layer that are formed in this order on at least one side of the transparent plastic film substrate,
wherein a hard coating layer-forming material contains 100 parts by weight of a (meth)acrylate group-containing curable compound (A) and 0.01 to 3 parts by weight of a (meth)acrylate group-containing reactive silicone (B),
wherein an antireflection layer-forming material contains a siloxane component-containing compound,
wherein at the interface between the hard coating layer and the antireflection layer, the hard coating layer and the antireflection layer are in direct contact with each other,
wherein the reactive silicone (B) is a mixture of compounds represented by formula (6):

[formula 6]

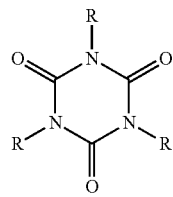

(6)

wherein at least one of the R groups has at least one substituent selected from a siloxane structure-containing substituent, a (meth)acrylate group-containing substituent, and an active hydrogen group-containing substituent, and wherein the mixture of compounds represented by formula (6) comprises:
(i) the compound in which the at least one of the R groups has the siloxane structure-containing substituent,
(ii) the compound in which the at least one of the R groups has the (meth)acrylate group-containing substituent, and
(iii) the compound in which the at least one of the R groups has the active hydrogen group-containing substituent, and
wherein the active hydrogen group is at least one of a hydroxyl group, an amino group, and a carboxyl group.

2. The antireflection hard coating film according to claim 1, wherein the compounds represented by formula (6) have a structure represented by formula (7):

[formula 7]

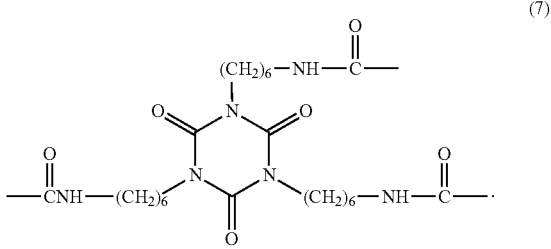

(7)

3. The antireflection hard coating film according to claim 1, wherein the siloxane structure-containing substituent represented by R in the compounds represented by formula (6) has a unit represented by formula (8):

[formula 8]

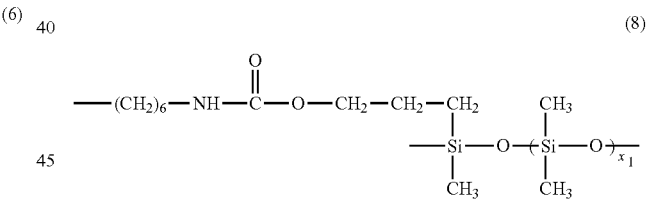

(8)

wherein x1 is from 1 to 7.

4. The antireflection hard coating film according to claim 1, wherein the active hydrogen group-containing substituent represented by R in the compounds represented by formula (6) has a unit represented by formula (9):

[formula 9]

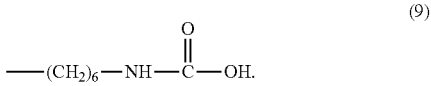

(9)

5. The antireflection hard coating film according to claim 1, wherein the acrylate group-containing substituent represented by R in the compounds represented by formula (6) has a unit represented by formula (10):

[formula 10]

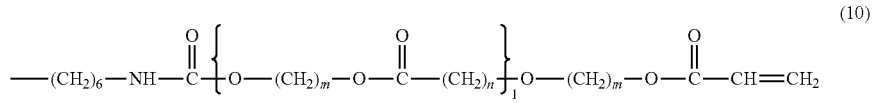

(10)

wherein m and n is the same or different and are each an integer of 1 to 10, and l is from 1 to 5.

6. The antireflection hard coating film according to claim 1, wherein the hard coating layer has a thickness of 2 to 50 μm.

7. The antireflection hard coating film according to claim 1, wherein the antireflection layer-forming material contains a siloxane oligomer (C) with an ethylene glycol-equivalent average molecular weight of 500 to 10000 and a fluorine compound (D) having a polystyrene-equivalent number average molecular weight of 5000 or more and having a fluoroalkyl structure and a polysiloxane structure.

8. The antireflection hard coating film according to claim 1, wherein ultrafine particles of silicon oxide each in the shape of a hollow sphere are contained in the antireflection layer.

9. The antireflection hard coating film according to claim 1, wherein the hard coating layer has an irregular surface with antiglare properties.

10. An optical element comprising the antireflection hard coating film according to claim 1 laminated on one side or both sides of an optical element.

11. An image display comprising the antireflection hard coating film according to claim 1.

12. An image display comprising the optical element according to claim 10.

* * * * *